US012323427B2

(12) United States Patent
Hutelmyer et al.

(10) Patent No.: US 12,323,427 B2
(45) Date of Patent: Jun. 3, 2025

(54) USER RISK SCORING BASED ON ROLE AND EVENT RISK SCORES

(71) Applicant: Target Brands, Inc., Minneapolis, MN (US)

(72) Inventors: Paul Hutelmyer, Minneapolis, MN (US); Adam Blake, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 198 days.

(21) Appl. No.: 17/992,107

(22) Filed: Nov. 22, 2022

(65) Prior Publication Data

US 2023/0239303 A1     Jul. 27, 2023

Related U.S. Application Data

(60) Provisional application No. 63/302,788, filed on Jan. 25, 2022.

(51) Int. Cl.
*H04L 9/40* (2022.01)

(52) U.S. Cl.
CPC ........ *H04L 63/102* (2013.01); *H04L 63/1425* (2013.01); *H04L 63/1433* (2013.01)

(58) Field of Classification Search
CPC ............... H04L 63/102; H04L 63/1425; H04L 63/1433
See application file for complete search history.

(56) References Cited

U.S. PATENT DOCUMENTS

| 8,566,956 | B2 | 10/2013 | Slater |
| 9,324,119 | B2 | 4/2016 | Singh et al. |
| 9,798,883 | B1 | 10/2017 | Gil et al. |
| 10,505,965 | B2 | 12/2019 | Moyle et al. |
| 11,012,454 | B1 * | 5/2021 | Han ..................... H04L 63/1425 |
| 2008/0288330 | A1 * | 11/2008 | Hildebrand ...... G06Q 10/06398 |
| | | | 705/7.42 |
| 2010/0125911 | A1 | 5/2010 | Bhaskaran |

(Continued)

FOREIGN PATENT DOCUMENTS

CN         101706937 A  *  5/2010

*Primary Examiner* — Linglan Edwards
*Assistant Examiner* — Saron Matthewos Worku
(74) *Attorney, Agent, or Firm* — Barnes & Thornburg LLP

(57) ABSTRACT

Disclosed are techniques for monitoring internal security vulnerabilities in an enterprise based on determining composite risk scores for enterprise users. A method can include receiving information about an enterprise user, such as their role, identifying risks associated with the role, determining, based on the risks, a role-based risk score for the user, receiving, event alerts from a network security detection system, each event alert having been generated by the network security detection system identifying network activity on the enterprise's network that satisfies one or more security event rules indicative of a potential network security issue, determining that one or more of the event alerts are associated with the user in the enterprise to generate user-event pairings, determining, based on the user-event pairings, an event-based risk score for the user, and generating a composite risk score for the user based on aggregating the role-based risk score and the event-based risk score.

20 Claims, 9 Drawing Sheets

(56) References Cited

U.S. PATENT DOCUMENTS

| | | | |
|---|---|---|---|
| 2013/0097701 A1* | 4/2013 | Moyle | H04L 63/1416 726/22 |
| 2020/0356676 A1* | 11/2020 | Gorlamandala | G06F 21/577 |
| 2023/0231854 A1* | 7/2023 | Blake | H04L 63/1425 726/4 |

* cited by examiner

USER RISK SCORING BASED ON ROLE AND EVENT RISK SCORES

CROSS-REFERENCE TO RELATED APPLICATIONS

This application claims priority to U.S. Provisional Application Ser. No. 63/302,788, filed on Jan. 25, 2022, the disclosure of which is incorporated by reference in its entirety.

TECHNICAL FIELD

This document generally describes devices, systems, and methods related to computer network or endpoint security, such as monitoring network activity and assigning risk scores to users based on the network activity.

BACKGROUND

Organization security posture includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme. Sometimes, malicious actors can come from within an enterprise and can exploit the enterprise's network to their advantage and/or for malicious purposes.

Computer security in an organization can include both proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

The document generally relates to determining risk scores for users in an enterprise environment, which can be used to identify, assess, and prevent/respond to security threats within the enterprise environment. More specifically, users can be assigned risk scores based on a combination of multiple component scores that, collectively, provide an accurate quantitative assessment of a security risk posed by the user to the enterprise. Such scores can encompass multiple different risks that users may pose to an organization, such as risks associated with unintentional acts that pose security threats (e.g., risks associated with users being more vulnerable to security attacks by third parties, such as users who are more susceptible than others to phishing attempts) and risks associated with intentional acts (e.g., users intentionally attempting to steal proprietary, confidential, and/or trade secrets from the organization, such as by transmitting files outside of the organization, or sabotage of security controls). Component scores that are used to determine a user's risk score can include, for example, role-based risk scores that indicate risks associated with a user's role within the organization and event-based risk scores that indicate risks associated with a user's specific actions within the organization. The disclosed technology can develop more persistence around a user's role and their historic behavior to more accurately assess risk associated with that user—meaning that risky actions taken a month or two ago can still influence the current risk of the user. A user's risk score can change over time based on the user's everyday activity in the enterprise. The user's risk score can also depreciate as more time passes from when alerting activity occurs to provide persistence yet more accuracy around the present risk posed by a user. For example, more recent actions can be a more accurate indicator of risks posed by a user and negative actions taken a long time ago may not accurately indicate those risks. To account for this, the disclosed technology can still look at the historic behavior of a user, but can degrade risk scores associated with those historic actions over time and decrease the user's overall risk score gradually the further away from those historic actions, which can provide a more accurate assessment of a user's current risk to the organization.

The user's risk score, a composite risk score, can be a combination of a role-based risk score and an event-based risk score. The role-based risk score can be based on inherent risks posed by different roles within the enterprise. This score may change in situations when the user's role changes (e.g., the user gets a promotion or wholly changes roles/jobs in the enterprise). Roles that have access to more sensitive information in the enterprise can be assigned higher role-based risk scores than roles that do not have access to sensitive information. As an illustrative example, a user with a marketing role can be considered less risky than a user with a cybersecurity role in which the latter user has more access to sensitive information. Thus, the user with the cybersecurity role can have a higher role-based risk score than the user with the marketing role.

The event-based risk score can be based on specific activities of the user that occur over time (or within a certain period of time). This score can be dynamic and based on what type of alerts are generated from different types of activities that are associated with/attributed to the user. Activities that occur within the enterprise network can be logged. Some activities may generate alerts because the activities can satisfy one or more security vulnerability rules. Activity that generates alerts can then be paired (e.g., associated) with users in the enterprise. Such pairings can be used to determine event-based risk scores for the users.

Some activities may pose more of a security vulnerability to the enterprise than other activities, which, in turn, can affect the user's event-based risk score. Varying severities of alerts can be triggered for a variety of activities, such as visiting different websites while connected to the enterprise network or using computing devices of the enterprise, accessing and/or using personal email within the enterprise's network, downloading files from external networks, transmitting files from within the enterprise's network, accessing and/or using internal information, etc. Sometimes, as an example, accessing personal email may generate a low risk alert but transmitting information from within the enterprise via the user's personal email may generate a higher risk alert. The latter can cause the user to have a higher event-based risk score than the former. Thus, the type of activities of the user and the types of alerts generated in response to such activities can be used to determine the user's event-based risk score.

The event-based risk score can increase quickly as more alerts are attributed to the user during a given period of time. For example, if, during the given period of time, a user routinely sends internal information via their personal email, they can be assigned a high event-based risk score in comparison to another user who sends internal information via their personal email on one occasion during the given period of time. The event-based risk score can also depreciate slowly as time passes from when alerts were generated and/or associated with a user. The event-based risk score can also depreciate over time as the user engages in activity that does not trigger alerts.

The composite risk score can combine both rule-based information with dynamic event-based information to determine what threats internal users may pose to the enterprise. As an example, a user with authorization to access sensitive internal data may send large quantities of information via their email during a given period of time and thus be assigned a high composite risk score. After all, since the user has authorization to access sensitive internal data, their role-based risk score can be higher than someone who does not have such access privileges. Moreover, since the user is sending large quantities of information via email during the period of time, more events and/or riskier events may be attributed to the user, thus giving them a high event-based risk score. When the role-based and event-based risk scores are aggregated, the composite risk score for the user can be higher than other users in the enterprise, such as an application developer who does not have access to that same information (and therefore has a lower role-based score) but also sends out large quantities of other information (e.g., non-sensitive information) (and therefore can have a relatively high event-based risk score based on frequency of their activity) via their email during the given period of time. Sometimes, composite risk scores can also be compared within a team or other group of users in the enterprise to accurately assess which user(s) may pose a current risk to the enterprise.

One or more embodiments described herein can include a method for monitoring internal security vulnerabilities in an enterprise based on determining composite risk scores for users in the enterprise, the method including: receiving, by a computing system, information about a user in the enterprise that can include a role of the user, identifying, by the computing system and based on the information about the user, risks associated with the role of the user, determining, by the computing system and based on the risks associated with the role of the user, a role-based risk score for the user, receiving, by the computing system, a event alerts from a network security detection system, each of the event alerts having been generated by the network security detection system identifying network activity on a network for the enterprise that satisfies one or more security event rules indicative of a potential network security issue, determining, by the computing system and based on information associated with the event alerts, that one or more event alerts are associated with the user in the enterprise to generate user-event pairings, determining, by the computing system and based on one or more of the user-event pairings that correspond to the user, an event-based risk score for the user, which can be a dynamic value, generating, by the computing system, a composite risk score for the user based on aggregating the role-based risk score and the event-based risk score, and transmitting, by the computing system and to a user device, the composite risk score for the user to be outputted in a graphical user interface (GUI) display at the user device.

In some implementations, the embodiments described herein can optionally include one or more of the following features. For example, the method can include storing, by the computing system, the role-based risk score in a data store. The method can include caching, by the computing system, the event-based risk score in local memory. The method can include caching, by the computing system, the user-event pairings in local memory. Determining, by the computing system, the role-based risk score for the user can include: accessing a lookup table of point allocations per role in the enterprise, identifying a quantity of points to allocate to the role-based risk score that corresponds to the risks associated with the role of the user in the lookup table, and adding the quantity of points to the role-based risk score of the user. Determining, by the computing system, the event-based risk score for the user can also be based on at least one of (i) a type of the one or more user-event pairings that correspond to the user and (ii) a frequency of occurrence of the one or more user-event pairings that correspond to the user during a predetermined period of time. Determining, by the computing system, the event-based risk score for the user can include increasing the event-based risk score for the user by a predetermined amount of points based on at least one of (i) a quantity of the one or more user-event pairings that correspond to the user during a predetermined period of time exceeding a threshold quantity and (ii) a frequency of occurrence of the one or more user-event pairings that correspond to the user during the predetermined period of time exceeding a threshold frequency.

As another example, determining, by the computing system, the event-based risk score for the user can include depreciating the event-based risk score for the user by a predetermined amount of points based on at least one of (i) a quantity of the one or more user-event pairings that correspond to the user during a predetermined period of time being less than a threshold quantity and (ii) a frequency of occurrence of the one or more user-event pairings that correspond to the user during the predetermined period of time being less than a threshold frequency. The predetermined amount of points can be a percentage of points. The predetermined amount of points may not exceed 50 points.

In some implementations, the method can include receiving, by the computing system, a second group of event alerts, determining, by the computing system and based on information associated with the second group of event alerts, that one or more event alerts from among the second group of event alerts are associated with the user in the enterprise to generate second user-event pairings, updating, by the computing system and based on one or more of the second user-event pairings that correspond to the user, the event-based risk score for the user, and updating, by the computing system, the composite risk score for the user based on aggregating the role-based risk score and the updated event-based risk score for the user. The information associated with the event alerts each can include an objective identifier that matches information of at least one user in the enterprise, the objective identifier including at least one of an IP address and an email address.

In some implementations, the information associated with the event alerts can include tags identifying types of risks associated with the one or more event alerts. The method can also include storing, by the computing system, the tags in the data store, accessing, by the computing system, the tags, identifying, by the computing system and based on the tags, historic behavior of the user, the historic behavior indicating types of activity that the user had previously engaged in, and determining, by the computing system and based on the historic behavior of the user, whether the user (i) poses a threat to the enterprise at a present time or (ii) is a repeat offender. Moreover, the method can include sensing, by network sensors of the computing system, operations of a data network in the enterprise, generating, by the network sensors of the computing system and based on sensing the operations of the data network, event data objects that record the operations of the data network, and decorating, by one or more decorator pipelines of the computing system, the event data objects with data other than from the operations of the data network to generate the one or more event alerts.

One or more embodiments described herein can include a system for monitoring internal security vulnerabilities in an enterprise based on determining composite risk scores for users in the enterprise, the system including: at least one processor and a memory device storing instructions that are operable, when executed by the at least one processor one or more computers, to cause the at least one processor to perform operations including: receiving information about a user in the enterprise, the information including a role of the user, identifying, based on the information about the user, risks associated with the role of the user, determining, based on the risks associated with the role of the user, a role-based risk score for the user, receiving event alerts from a network security detection system, each event alert having been generated by the network security detection system identifying network activity on a network for the enterprise that satisfies one or more security event rules indicative of a potential network security issue, determining, based on information associated with the event alerts, that one or more event alerts are associated with the user in the enterprise to generate user-event pairings, determining, based on one or more of the user-event pairings that correspond to the user, an event-based risk score for the user, the event-based risk score being a dynamic value, generating a composite risk score for the user based on aggregating the role-based risk score and the event-based risk score, and transmitting, to a user device, the composite risk score for the user to be outputted in a graphical user interface (GUI) display at the user device.

In some implementations, the system can include one or more of the abovementioned features.

The devices, system, and techniques described herein may provide one or more of the following advantages. For example, the disclosed techniques can provide for dynamically assessing risks that users pose to the enterprise based on aggregation of role information, alerts triggered by activities of the user, case data, and other information about the user. In other words, the disclosed techniques provide for aggregating different types of data in an enterprise network to make meaningful associations and insights about users in the enterprise. As a result, an enterprise can accurately and effectively assess which users may pose a threat at a present time, how users have posed threats to the enterprise over time, and what type of threat(s) users may pose to the enterprise. Similarly, although a composite risk score of a user may change over time (e.g., based on activity associated with the user), historic tags indicating types of activity of the user can be stored and used to generate a more holistic understanding of why the user might have been assigned a high composite risk score in the past, what type of threat or threats the user may pose in the future (e.g., a repeat offender), and/or how to respond to alerts that are triggered by the user's activity in the enterprise.

As another example, the disclosed techniques can be used to prioritize threats, thereby focusing investigations on high risk users who conduct high risk behaviors, rather than focusing investigations on individual, isolated risks. Moreover, the disclosed techniques provide more comprehensive analysis and review of high risk, and non risky behaviors, based on the ability to group users in one to many groups, based on role, activities, and other data associated with the users.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to determining what internal risk users, such as employees or contractors may pose to an enterprise. A user in the enterprise can be assigned a composite risk score, which can be an aggregation of a role-based risk score and an event-based risk score of the user. The role-based risk score can be a value that corresponds to risk inherent in the user's particular role (e.g., job functions). The event-based risk score can be a dynamic value that is based on what activities the user performs in the enterprise and what alerts are triggered by those activities. Alerting activities can be associated with the user and used to increase and/or decrease the user's event-based risk score over a certain period of time. Thus, the user's event-based risk score can increase quickly during the certain period of time as more activities are attributed to the user and can decrease slowly as more time passes from the alerting event(s). The composite risk scores can then be used, by the enterprise and/or a cybersecurity entity/system, to assess which users may pose risks to the enterprise at a current time and/or in the future (e.g., such as with repeat offenders).

Figure 1:
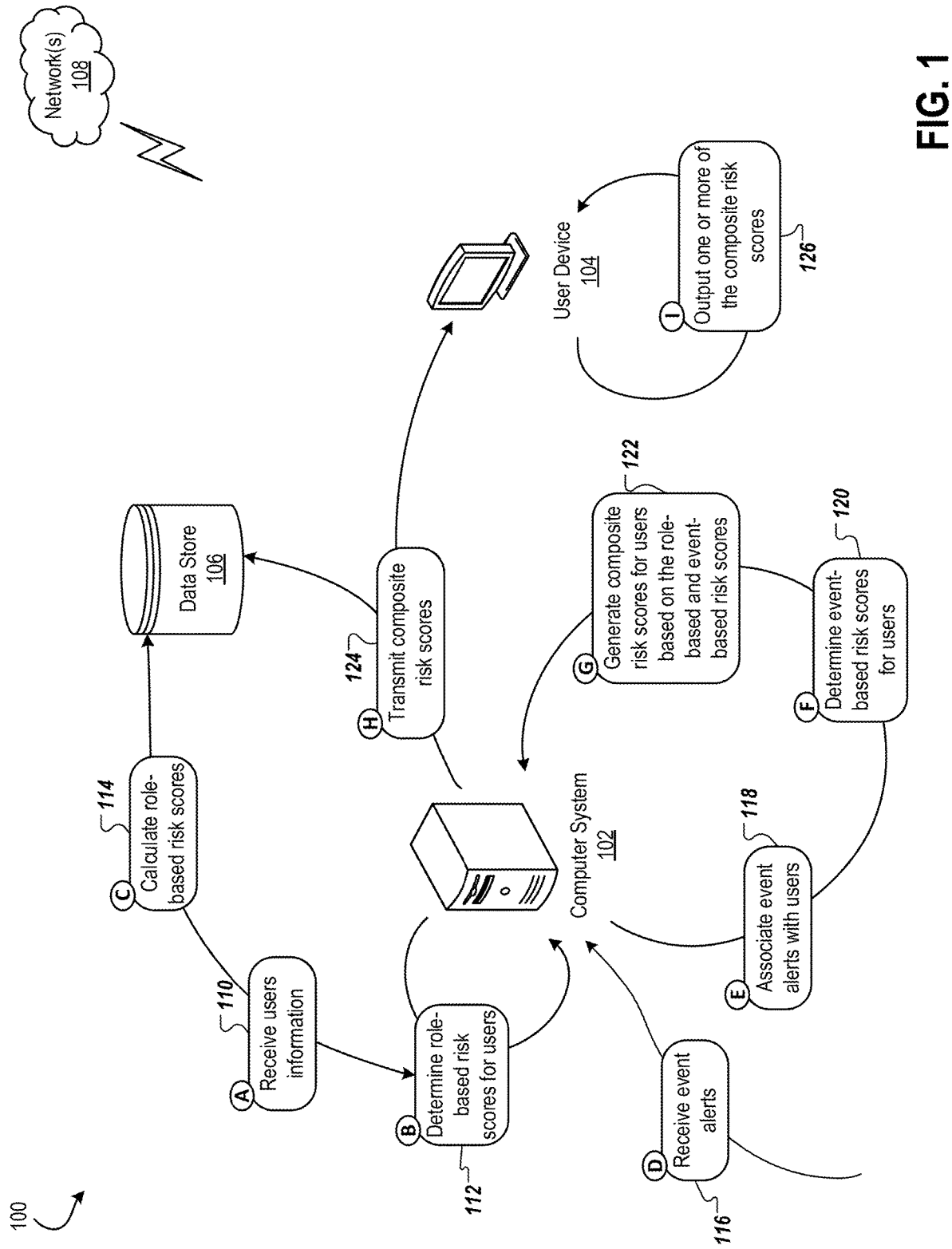
FIG. 1 is a conceptual diagram of determining composite risk scores for users based on their respective role-based and event-based risk scores.

Referring to the figures, FIG. 1 is a conceptual diagram of determining composite risk scores for users based on their respective role-based and event-based risk scores. The enterprise 100 can be an organization, business, corporation, or other grouping/network of users. The enterprise 100 can include devices, computing systems, and/or users that are located within a local area network (LAN). The enterprise 100 can also include devices, computing systems, and/or users that are not all located near each other or within the LAN. For example, one or more of the devices, computing systems, and/or users can be remote from other devices, computing systems, and/or users in the enterprise 100.

A computer system 102 can communicate with a user device 104 and a data store 106 via network(s) 108. The computer system 102 can be configured to generate role-based risk scores, event-based risk scores, and/or composite risk scores for users in an enterprise 100 (e.g., organization). The user device 104 can be a computing device (e.g., mobile device, mobile phone, laptop, computer, tablet, etc.) of a relevant user in the enterprise 100, such as a security analyst. The security analyst can be tasked with monitoring network activity and security (e.g., externally and/or internally) for the enterprise 100. The data store 106 can be any type of storage device, including but not limited to a database, data repository, data store, data lake, and/or cloud-based data storage. In some implementations, the computer system 102, the user device 104, and/or the data store 106 can be part of a same computer system, network of devices, cloud-based system, and/or cloud-based service.

The computer system 102 can receive users' information (step A, 110). The information can include a role of each of the users. Using this information, the computer system 102 can determine role-based risk scores for the users (step B, 112). A role-based risk score may change when a user's role changes, when responsibilities within the user's role change, if the user is no longer active in the enterprise, if the user loses one or more entitlements, and/or if the user switches teams. The role-based risk score can be based on inherent risks associated with the user's particular role. In general, roles with more entitlements can be assigned higher role-based risk scores than roles with fewer entitlements. Certain roles, such as executive administrators, CEOs, CFOs, etc., can result in higher role-based risk scores than other roles. For example, roles that have access to proprietary information or other entitlements can cause the role-based risk score to be higher than roles that do not have such privileges. The role-based risk score can also be higher for users that are put on a performance plan, submitted their two weeks' notice, and/or are considered or known as repeat offenders in the enterprise. The role-based risk score can also be determined based on information including but not limited to entitlements, access to shared accounts or sensitive data, similar behavior patterns, reporting structure, and externally identified grouping criteria, such as employees undergoing performance management.

The computer system 102 can calculate the role-based risk scores in step C (114). These scores can be stored in the data store 106 and associated with each respective user. As described herein, the role-based risk scores may not dynamically change, and therefore can be stored and retrieved for later use in determining composite risk scores for users.

Figure 5A:
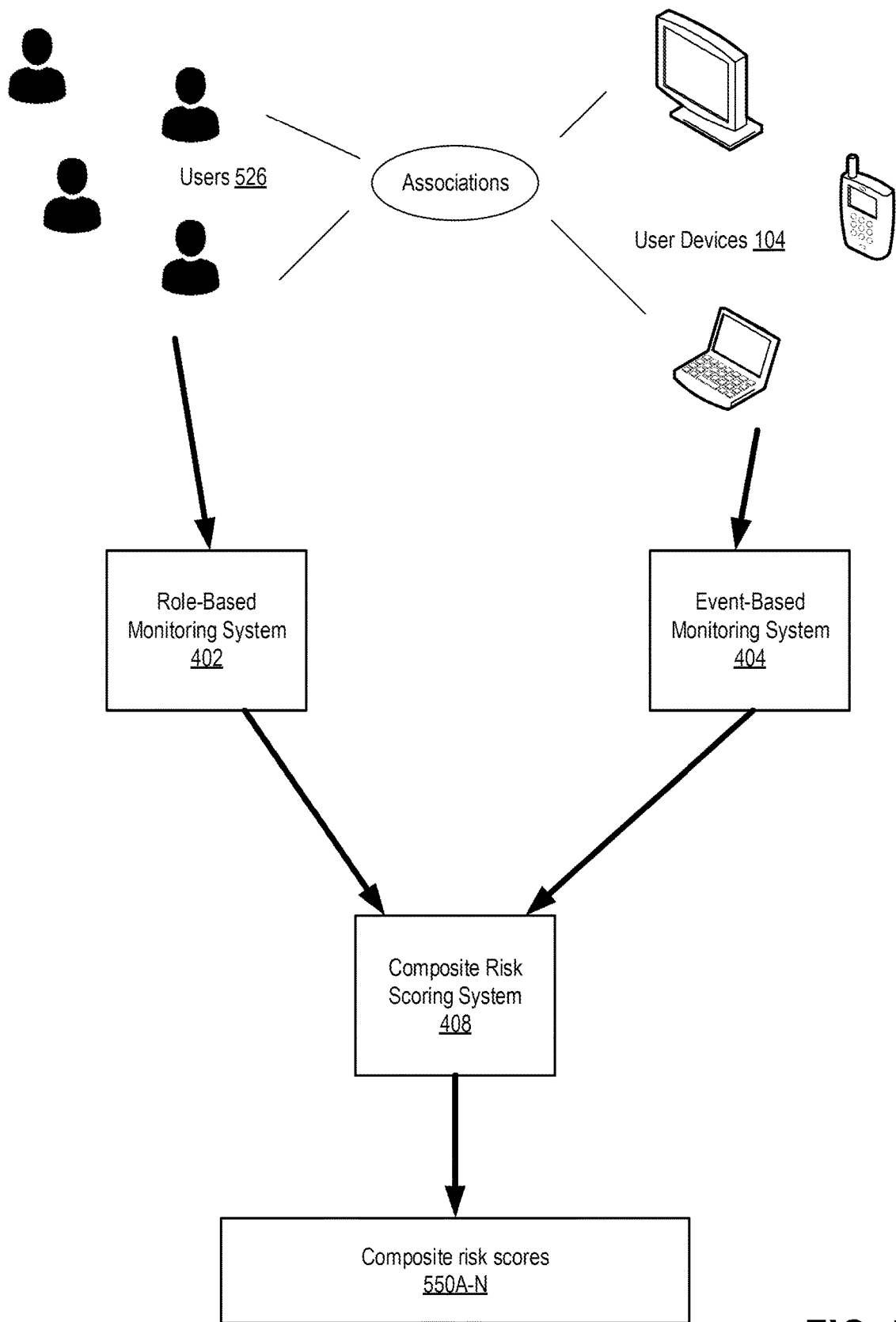
FIG. 5A is a conceptual diagram for determining composite risk scores for users in an enterprise.
Figure 5B:
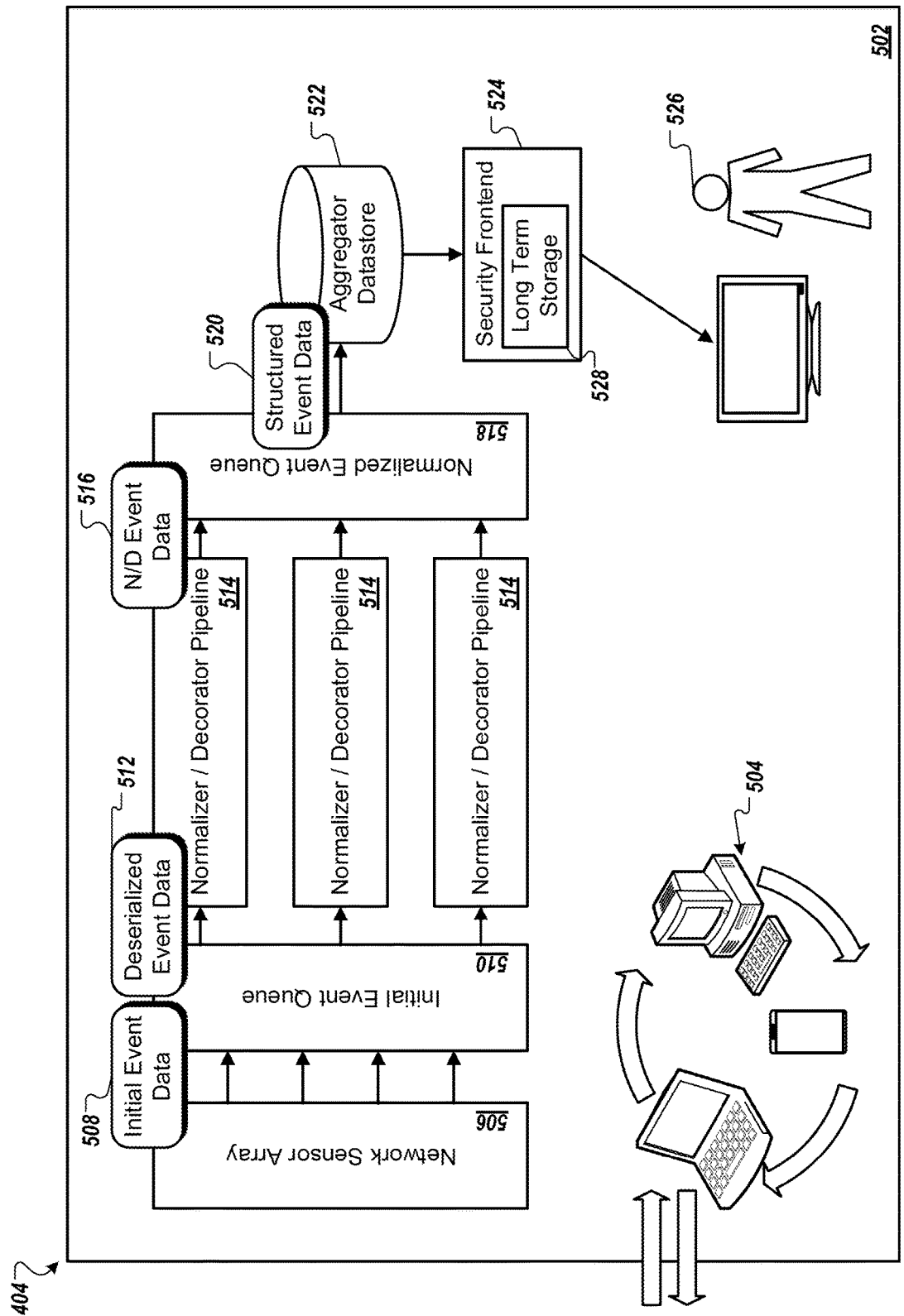
FIGS. 5B-C are block diagrams of an example system for generating events in response to network activity.
Figure 5C:
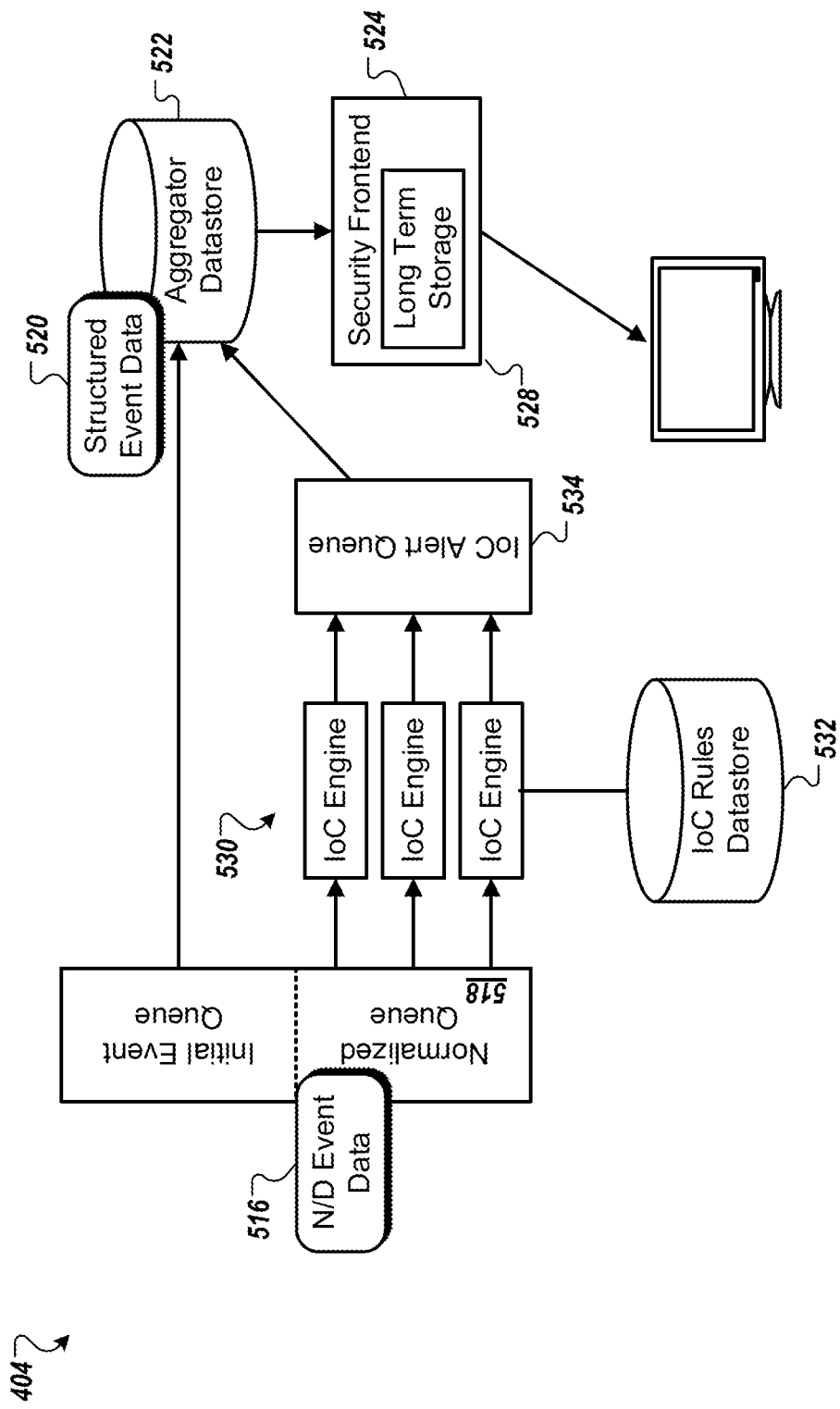

The computer system 102 can also receive event alerts (step D, 116). As described throughout this disclosure, activities performed in the enterprise 100 network can be logged and analyzed as events. The computer system 102 and/or another computing system, such as a security system, can analyze the events. The events can be checked against one or more rules and/or sets of rules to determine whether the events pose risks (e.g., security threats and/or vulnerabilities) to the enterprise 100. When events satisfy one or more of the rules, alerts can be generated to identify and flag those events for additional inspection. A security analyst or other relevant user in the enterprise 100 can determine and/or implement one or more mitigation operations to remedy and/or prevent potential risks posed by the alerted events. Refer to FIGS. 5A-C for further discussion about events, analysis of events identified in the enterprise 100 network, and alerting on such events.

Sometimes, the computer system 102 can receive the event alerts before, during, or after steps A-C (110-114). In some implementations, steps A-C (110-114) can be performed at predetermined time intervals, for example, once a day, twice a week, and/or once a month. In some implementations, steps A-C (110-114) can be performed only when a user's role changes. On the other hand, Step D (116) and the subsequent steps (e.g., steps E-I, 118-126) can be performed continuously, more frequently, and/or whenever events are alerted on.

Still referring to step D (116), the computer system 102 can receive the event alerts, which originate from network activity, from a computing system and/or network such as a Security Incident and Event Management (STEM) system. Sometimes, the computer system 102 can poll the SIEM for any event alerts that occurred during a predetermined period of time. The SIEM can then respond with the event alerts that occurred during the period of time. In some implementations, the computer system 102 can automatically receive the event alerts from the SIEM and/or another computing system (e.g., a security system) in real-time, when the alerts are triggered.

The computer system 102 can then associate the event alerts with users (step E, 118). Event alerts can be associated with users using objective and unique identifiers of the users, such as emails and/or IP addresses. Associating the event alerts with users can include pairing the users in the enterprise 100 with activities they performed in the enterprise 100.

The computer system 102 can accordingly determine event-based risk scores for the users (step F, 120). The event-based risk scores can dynamically change over time and/or during a predetermined period of time. The event-based risk scores are dynamic since activity performed during a certain period of time (e.g., a present time period) can be a strong indicator of whether a user poses a threat to the enterprise 100 at the present time. Hence, the event-based risk score of a user can increase quickly (e.g., by a predetermined amount and/or percentage) when the user continues to be associated with event alerts during the predetermined period of time. For example, increased frequency of associations and/or a quantity of associations that exceeds some predetermined threshold range can result in a higher event-based risk score for the user. Moreover, an event-based risk score can dynamically change based on a combination of defined categories. When an event occurs, for example, that event's category may have associated values that can be added to the event-based risk score. An increase in a variety of categories can, in some implementations, cause the event-based risk score to increase more than if additional events are identified in the same category.

The event-based risk scores can be determined based on looking at historic information about what events have been attributed to the user during a prior time period. The more risky events that have been attributed to the user in the past, the greater the risk the user may pose during a present time period. The event-based risk scores can also be determined based on activity that is known or expected within the enterprise. For example, more risk can be expected in certain aspects of the enterprise in comparison to others. As the risk expected in such aspects of the enterprise change the event-bases risk scores may also dynamically change (e.g., a risker aspect of the enterprise can result in a higher risk score than a less risky aspect of the enterprise).

Moreover, the event-based risk scores can be determined quickly and efficiently in real-time since the computer system 102 is accessing information that is stored locally in the data store 106. In other words, the computer system 102 may not have to wait on third party services to provide the computer system 102 with information about present event alerts and/or prior/historic event alert attributions.

The event-based risk score of the user can depreciate more slowly over time. For example, less frequency of associations over the predetermined period of time and/or a quantity of associations that is less than some predetermined threshold range can result in depreciation of the user's event-based risk score. The event-based risk score can depreciate over time as the user is associated with more events that do not alert or otherwise do not represent potential threats to the enterprise 100. The event-based risk score can also depreciate over time if the user is not associated with more event alerts over the predetermined period of time.

The score can depreciate by one or more predetermined amount of points. Depreciation can occur over one or more predetermined periods of time. For example, the event-based risk score can depreciate over a course of 30 days. One or more other periods of time are also possible, including but not limited to 1 month, 2 months, 3 months, etc. The predetermined amount of points of depreciation may also vary. As an illustrative example, the score can depreciate by 30 points with every month that passes from when the user was associated with an event alert (or some predetermined quantity of event alerts). As another example, 33% of points in the event-based risk score can be lost over every 30 days so long as the user is not associated with additional event alerts and/or the user is associated with a quantity of additional event alerts that is less than some predetermined threshold quantity over the 30 days. In some implementations, the event-based risk score may not depreciate more than 50 points over 30 days.

In some implementations, the event-based risk score can depreciate at different rates. A rate of depreciation can depend on a time of year. For example, the computer system 102 can analyze historic trends of activity over the course of a year to determine when the rate of depreciation should be slower or faster. The computer system 102 can analyze historic trends in volume of events/activity over the course of the year. If less activity occurs during a period of time during the year (e.g., during a period of time that has previously been associated with higher risk, such as a holiday season), then the rate of depreciating the event-based risk score can be lower than during a period of time during the year when there is more activity. For example, during a time when bonuses are given out to enterprise employees, there may be more activity. Thus, during the bonus season, the rate of depreciating the event-based risk score can be higher than during other seasons when bonuses are not given to employees. The rate of depreciation can also dynamically change based on changes in the enterprise environment, such as using/implementing new products, tools, and/or software for the enterprise employees. As another example, a contractor's risk score can increase every 6 months or whenever their contract is renewed with the enterprise. If the contractor triggers an event alert within a predetermined period of time from when the contract is renewed (e.g., 2 months from anniversary), then the contractor's event-based risk score can be depreciated slower than if they did not trigger an event alert during that predetermined period of time. The event-based risk score may depreciate by one or more other predetermined amounts of points and/or under one or more other conditions.

The event-based risk score can be assigned based on a type of event (e.g., activity) that occurs and/or a type of alert that is generated in response to the event. The event alerts can also be categorized into one or more different risk categories and tagged as such. These tags can be stored in associated with the users and used, by the computer system 102, for historic analysis of the users. Historic analysis can be used to identify what types of activities the users performed in the past and what types of risks they posed to the enterprise 100. The tagging can also be beneficial to identify repeat offenders, predict likelihood of future risk posed by the user(s) to the enterprise 100, and provide a more holistic view and understanding of the user(s) and why the users might have been assigned higher event-based risk scores in the past or doing prior predetermined periods of time.

Additionally, the tagging of events by category can be used to determine how many points to allocate to the user's event-based risk score. Point values can be predefined by relevant users in the enterprise 100, such as a security analyst. In some implementations, point values can be dynamically defined and/or updated based on historic analysis of types of events that trigger alerts in the enterprise 100. Point values can be defined in tables per risk category. Each row in a table can correspond to a rule (e.g., security check, security rule, etc.) that can be triggered for the particular risk category. Thus, when a rule is triggered in an event, an alert is triggered. The computer system 102 can identify what category that rule is associated with, select the points table for that category, and then identify which row in the table corresponds to the rule. The computer system 102 can then increase the associated user's event-based risk score (or assign the event-based risk score) with the points value in the identified row.

The computer system 102 can generate composite risk scores for the users based on their corresponding role-based and event-based risk scores (step G, 122). The computer system 102 can average and/or aggregate the role-based and event-based risk scores for a particular user. In some implementations, the role-based risk score can be used to weigh the event-based risk score, thereby determining the composite risk score for that user. The user's role can therefore affect how risky the user's event alert associations may be to the enterprise 100. For example, a user with more entitlements can be assigned a high role-based score. That same user may also be associated with a quantity of event alerts during the given period of time that exceeds a predetermined threshold quantity of event alerts. Accordingly, the user may be assigned a high event-based risk score. Since the user also has a high role-based score, the user's composite risk score may be even higher than another user who has a similar event-based risk score but fewer role-based entitlements (and thus a lower role-based risk score). As another example, a user who has access to sensitive internal data in the enterprise 100 (and thus is assigned a high role-based risk score) may send that data in large quantities via their personal email (and thus be associated with corresponding event alerts). That user can receive a high composite risk score because their role makes their activity of sending the sensitive data in large quantities via personal email more of a threat to the enterprise 100 than someone who does not have access to the sensitive internal data but sends large quantities of other data via their personal email. Furthermore, threshold levels for generating the composite risk scores can be based on the user's particular role.

The computer system 102 can transmit the composite risk scores to the data store 106 and/or the user device 104 (step H, 124). The composite risk scores can be stored in the data store 106 and retrieved at another time for further processing and/or analysis. For example, the composite risk scores can be used to assess users relative to each other and/or to determine which users may pose a present threat or a greatest threat to the enterprise 100.

The composite risk scores can be transmitted to the user device 104 to be outputted and presented to a relevant user, such as a security analyst. The user device 104 can output one or more of the composite risk scores (step I, 126). For example, the user device 104 can output a subset of the composite risk scores, such as composite risk scores that are ranked highest or within a predetermined threshold range of the composite risk scores. The user device 104 can also output a subset of the composite risk scores associated with users in a particular role, team, or other group in the enterprise 100. The user device 104 can also output all of the composite risk scores. In some implementations, the user device 104 can output composite risk scores that have changed over a predetermined period of time. Sometimes, the user device 104 can also generate and/or output suggestions for addressing the one or more composite risk scores that are outputted at the user device 104. For example, the suggestions can include monitoring the users associated with the outputted composite risk scores. The suggestions may also include adjusting one or more privileges, access rights, and/or entitlements of the users associated with the outputted composite risk scores. One or more other suggestions may also be determined and/or outputted at the user device 104. Thus, the user at the user device 104 can review, monitor, and/or address the outputted composite risk scores in order to mitigate or otherwise avoid potential security threats that are posed by users within the enterprise 100.

Figure 2A:
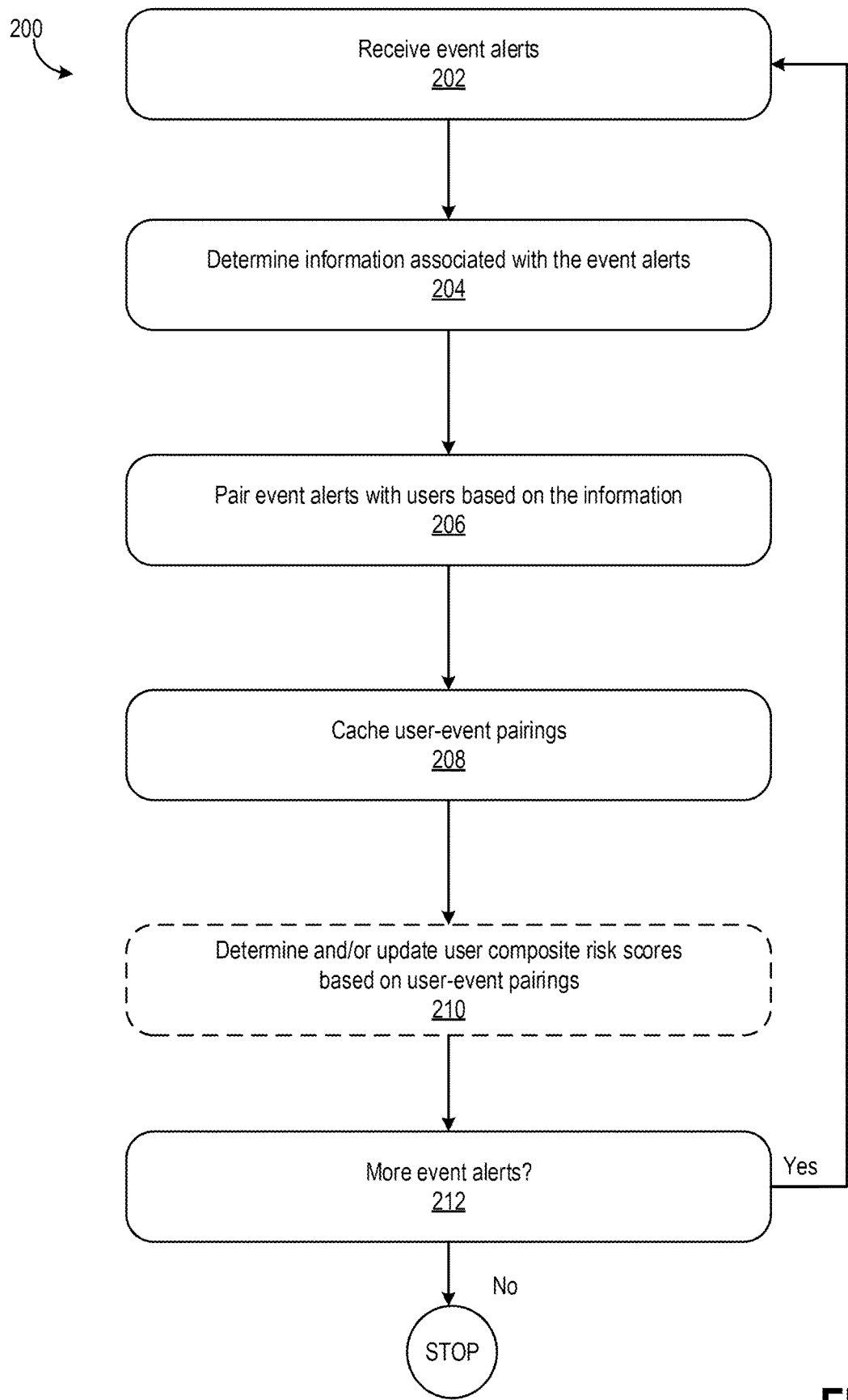
FIG. 2A is a flowchart of a process for pairing alerted events with users.

FIG. 2A is a flowchart of a process 200 for pairing alerted events with users. The process 200 can be performed to associate various activities with users in the enterprise. Activities can be logged in an event log. The activities can be analyzed by a computer system, such as a security system, to determine whether they trigger and/or satisfy one or more security rules. If the activities trigger and/or satisfy security rules, alerts can be generated in response. Thus, the activities may be flagged for additional inspection and/or review to assess whether such activities in fact pose a security threat to the enterprise. Sometimes, the activities may be benign while other times, the activities can raise suspicion of internal threats to the enterprise and other potential security vulnerabilities. The activity may include accessing certain websites while connected to a network of the enterprise, sending large quantities of information via personal email on the enterprise network, accessing sensitive/internal information, sending sensitive/internal information via personal email on the enterprise network, and other types of activities that may be classified (e.g., by a security analyst or other relevant user) as potential internal security vulnerabilities. In some implementations, the process 200 can be performed at a same time, before, or after process 250 described in FIG. 2B.

The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIG. 2A, the computer system can receive event alerts in 202. The event alerts can be received in real-time, as they are generated, logged, and/or analyzed by a computer system, such as a security system. The event alerts can also be received in batches at predetermined time intervals (e.g., once a day, every 12 hours, every 5 hours, every other day, etc.). Refer to FIGS. 5A-C for additional discussion on generating the event alerts.

The computer system can determine information associated with the event alerts in 204. This information can be determined from metadata or other information that is logged by the computer system and/or a security system when an event occurs and/or triggers an alert. The computer system can determine when and/or where the event was alerted within the enterprise network. The computer system can identify an IP address, email, or other identifier that can then be used to pair the event alert with a user in the enterprise. The computer system can also identify a type of event that was alerted. The type of event can be used by the computer system to determine how many points to allocate to an associated user's event-based risk score. The type of event can be identifiable from a tag that is associated with the event alert. In other words, when the event alerts, a tag can be generated (e.g. by a security system) that associates the event with a particular risk category. Example tags can represent different risk categories such as exfiltration, flight risk, control avoidance, and access abuse.

In 206, the computer system can pair event alerts with users based on the information. As mentioned above, the information can include an IP address, email, or other objective identifier. This objective identifier can identify a user who engaged in the activity that triggered an alert. Therefore, the computer system can pair or associate the event alerts with users in the enterprise by using the objective identifiers. In some implementations, events can also be associated with users based on computer names, computer identifiers, IP addresses assigned within the alert period, email addresses, or other types of user account identifiers.

The computer system can cache user-event pairings (208). These pairings can be temporarily stored at the computer system. Caching the pairings can be beneficial to increase processing power and efficiency when determining scores for the associated users. The computer system can also cache user-event pairings to save storage space in a data store, such as the data store 106. Instead, the computer system can store the tags, in association with the user (e.g. by using the unique identifier), that are associated with the event alerts in the data store. The computer system can then perform historical analysis, for each user, that assesses types of events that the user was associated with and that triggered alerts. The historical analysis can be performed to identify repeat offenders, predict activity of a user in the enterprise, and to analyze and understand the user's activity in the enterprise.

Optionally, the computer system can determine and/or update user composite risk scores based on the user-event pairings (210). More particularly, the computer system can determine and/or update a user's event-based risk score based on the user-event pairings, which, in turn, can affect the user's composite risk score. For example, if a user has not yet been assigned a composite risk score but has recently been paired with one or more alert events, the computer system can now determine the user's event-based risk score (based on the user-event pairings). The computer system can then aggregate the newly determined event-based risk score with a role-based risk score of the user to determine the user's composite risk score.

As another example, a user may have a low composite risk score because in the past the user might not have been paired or associated with event alerts. Thus, the composite risk score can reflect the user's role-based risk score more than an event-based risk score. However, assume that the user has now been paired or associated with an event alert, the user's composite risk score may be updated. The computer system can increase the user's event-based risk score by some predetermined quantity or amount of points due to the user-event pairing. The user's composite risk score may also increase based on a re-aggregation of the user's role-based risk score and the updated event-based risk score (a dynamic value).

In some implementations, the computer system may not perform block 210. The computer system can determine that a composite risk score should be determined and/or updated once a predetermined quantity of user-event pairings are cached over a predetermined period of time. For example, a user may be associated with one new event alert over the course of 30 days, which may not be sufficient to warrant updating the user's event-based risk score and, consequently, the user's composite risk score. On the other hand, if the user is associated with 10 new event alerts over the course of 30 days, the computer system can determine that the user's event-based risk score and, consequently, the user's composite risk score should be updated.

In some implementations, the computer system can update the user's composite risk score by depreciating the user's event-based risk score in 210. If, for example, a particular user is associated with no event alerts during the predetermined period of time, the computer system can depreciate the user's event-based risk score by a predetermined amount (or quantity of points). If, as another example, a particular user is associated with a quantity of event alerts during the period of time that is less than a predetermined threshold quantity (or less than quantities of associations for other users during the period of time), the computer system can depreciate the user's event-based risk score by the predetermined amount.

The computer system can then determine whether there are more event alerts in 212. If there are more event alerts, the computer system can return to 202 and repeat 204-210 for the remaining event alerts. Thus, the computer system can continue to pair event alerts with users in the enterprise and optionally determine and/or update composite risk scores for users who are paired with event alerts. If there are no more event alerts, the process 200 can stop at the present time. Thus, the computer system can determine that, at the present time, no additional pairings between event alerts and users can be made. The users' event-based risk scores may be most up to date, until new event alerts are generated, logged, and/or analyzed. In some implementations, the computer system can proceed to the process 250 in FIG. 2B instead of stopping the process 200.

Figure 2B:
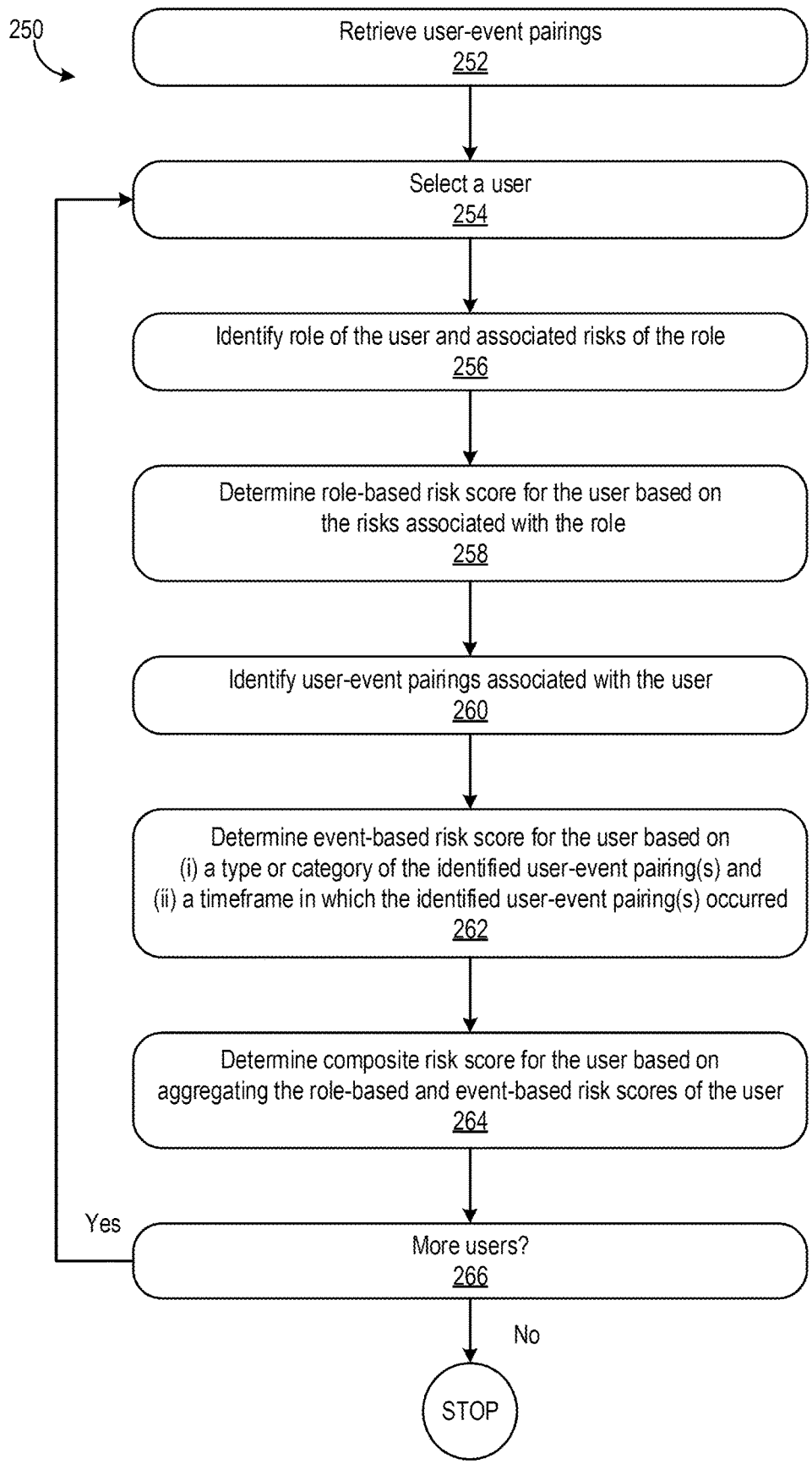
FIG. 2B is a flowchart of a process for determining a composite risk score for a user based on their role-based and event-based risk scores.

FIG. 2B is a flowchart of a process 250 for determining a composite risk score for a user based on their role-based and event-based risk scores. The process 250 can be performed to aggregate or otherwise combine the user's role-based risk score with the user's dynamic event-based risk score. The composite risk score can therefore be used to quantify a potential threat that the user poses to an enterprise at a present time. The process 250 can be performed to determine initial role-based, event-based, and/or composite risk scores for a user. The process 250 can also be performed to determine updates to a user's role-based, event-based, and/or composite risk scores. In some implementations, only portions of the process 250 can be performed. As an illustrative example, if a user's role-based risk score has already been determined, then blocks 256-258 in the process 250 can be skipped.

The process 250 can be performed by the computer system 102. The process 250 can also be performed by one or more other computing systems, devices, computers, networks, cloud-based systems, and/or cloud-based services. For illustrative purposes, the process 250 is described from the perspective of a computer system.

Referring to the process 250 in FIG. 2B, the computer system can retrieve user-event pairings in 252. The user-event pairings can be for a predetermined period of time. For example, the pairings can be for a past day. The pairings can also be for a past 2 days, 3 days, week, two weeks, month, etc. The retrieved user-event pairings can also be for one or more other predetermined periods of time. The user-event pairings can be used to determine associated users' event-based risk scores. As mentioned in reference to the process 200 in FIG. 2A, the user-event pairings can be cached by the computer system for quick and efficient retrieval and processing. In some implementations, block 252 can be performed later in the process 250, for example after block 258 and before block 260.

The computer system can select a user in 254. The computer system can select a user that is associated with an event alert in the retrieved user-event pairings. In some implementations, the computer system can select a user in a particular group, team, or other categorization of users in the enterprise. In some implementations, the computer system may select any user in the enterprise, a user whose role has recently changed, a user whose composite risk score has not been updated in a predetermined period of time, and/or a user who has not yet been assigned a composite risk score.

In 256, the computer system can identify a role of the user and associated risks of that role. The user's role can be identified from information stored about each user in the enterprise. The information can be stored in and accessed from a data store, such as the data store 106. This information can include the user's role, responsibilities, privileges, entitlements, restrictions, etc. This information can also include tags indicating past activities of the user, such as leaving the enterprise and coming back (e.g., flight), changes in role, responsibility, privileges, entitlements, and/or restrictions, and/or prior event alerts.

Once the computer system identifies the user's role from the information associated with that user, the computer system can use a lookup table to determine what risks are associated with that role. Roles can have different and/or similar risks. Some roles can be associated with higher risks than other roles. For example, executive roles with access to more sensitive, privileged information in the enterprise can be riskier than developer roles that do not have access to such sensitive, privileged information. Thus, the executive roles may pose more of a security threat to the enterprise than the developer roles if security events are associated with the executive roles.

The computer system may determine a role-based risk score for the user based on the risks associated with the role (258). This score may change when, for example, a user changes roles and/or responsibilities. The role-based risk score can be assigned a quantity of points based on the risks associated with the role. The more risks, the more points may be assigned to the score. The fewer risks, the fewer points may be assigned to the score. The quantity of points to assign can be predetermined by a relevant user, such as a security analyst in the enterprise. The quantity of points to assign can also be dynamically updated/determined by the computer system or a security system based on changes in a landscape of the enterprise (e.g., business rules, policies, management, roles, responsibilities, etc.). The role-based risk score can be a numeric value on a scale of 0 to 100, 0 being a role having no risk and 100 being a role having the most amount of risk. In some implementations, users may not be assigned a score of 0 since each role has at least a minimum amount of risk associated with it. A score of 0 can, for example, be assigned to users who have left the enterprise (e.g., quit, retired, etc.). Once the computer system determines the role-based risk score for the user, the computer system can store that score in association with the user. The role-based risk score can then be retrieved and used in subsequent processing and analysis.

The computer system can also identify user-event pairings that are associated with the user in 260. The computer system can analyze the user-event pairings that were received in 252 to determine which, if any of those pairings, include the selected user (254). The computer system can use an objective identifier, such as an email address and/or IP address of the selected user, to identify the user-event pairings associated with the user. In some implementations, where multiple user-event pairings are associated with the user, the computer system can generate a count that indicates a quantity of user-event pairings associated with the user. The count can then be used to determine an event-based risk score for the user.

Next, the computer system can determine an event-based risk score for the user based on (i) a type or category of the identified user-event pairing(s) and (ii) a timeframe in which the identified user-event pairing(s) occurred (262). The event-based risk score can be a numeric value, such as a value on a scale of 0 to 100, as described in reference to the role-based risk score. The event-based risk score can also be allotted predetermined quantities of points based on (i) and/or (ii).

As described in reference to the process 200 in FIG. 2A, each user-event pairing can include information such as a tag identifying a type (or category) of risk associated with the event. The information can also include a timestamp indicating when the event was generated, logged, analyzed, and/or alerted. The computer system can use this information to determine the event-based risk score for the user.

Some pairing types can be riskier to the enterprise than other pairing types. The riskier pairing types can cause the event-based risk score to be higher than if the pairing type is less risky. For example, a pairing type of transmitting large quantities of internal information via personal email can be identified as high risk. A pairing type of transmitting large quantities of nonproprietary information via personal email can be identified as low risk. The high risk pairing type can result in a higher event-based risk score for the user in comparison to the low risk pairing type. As an illustrative example, printing or sending a same document to 15 email addresses including personal email addresses can be considered as a low exfiltration risk. However, sending 15 different documents once to the same destination identified as a personal email address can be considered a higher exfiltration risk and thus result in a higher event-based risk score.

Timing and/or frequency of the user-event pairings can also impact the event-based risk score. More frequent user-event pairings during a predetermined period of time can result in a higher event-based risk score. After all, a user who is more frequently associated with activity that alerts in a security system of the enterprise may pose a greater risk to the enterprise than a user who is infrequently associated with alerting activity. The user who is infrequently associated with alerting activity may have simply performed an activity by accident that caused the security system to alert. Therefore, the computer system may not be justified to assign that user a high event-based risk score. On the other hand, the user who is frequently associated with alerting activity may be purposely attempting to subvert a security wall or otherwise perform malicious or threatening activities within the enterprise. Thus, the computer system may be justified to assign that user a higher event-based risk score at a present time and/or for the predetermined period of time.

Once the predetermined period of time ends, the computer system can determine whether any new or additional user-event pairings are associated with the user over a next predetermined period of time. The computer system can accordingly update the user's event-based risk score for the next predetermined period of time. The computer system can determine and/or update the event-based risk score based on user-event pairings during a present time period. The event-based risk score may not be dynamically updated based on prior user-event pairings (e.g., user-event pairings during a past period of time) since the purpose of the event-based risk score is to identify whether the user poses a current threat to the enterprise. Therefore, the event-based risk score may be updated to reflect new user-event pairings (or absence thereof) during a next (such as a current or present) period of time.

In some implementations, the computer system can cache the determined event-based risk score to then be used in determining a composite risk score for the user. Instead of storing every event-based risk score for the user in the data store, the computer system can store tags associated with each event alerts that were paired with the user and used to determine the event-based risk scores for the user. The event-based risk scores can be temporarily stored (e.g., cached) for use in determining the composite risk score, then discarded. Discarding the event-based risk scores can free up compute resources and increase efficiency in data processing. Storing the tags, instead of the event-based risk scores, in the data store can be beneficial to utilize fewer compute resources and to increase efficiency in subsequent data retrieval and processing. The tags can be used in historical analysis to track activities of the user and to generate a more comprehensive understanding of what risk(s) the user has posed to the enterprise and/or may pose to the enterprise at the present time or a future time (e.g., identifying repeat offenders).

The computer system may also determine a composite risk score for the user based on aggregating the role-based and event-based risk scores of the user in 264. The computer system can retrieve the role-based risk score from the data store. The computer system can also retrieve the role-based risk score from a temporary cache. Additionally, the computer system can retrieve the event-based risk score from the cache.

The computer system can sum the role-based and event-based risk scores of the user to determine the composite risk score. One or more other statistical and/or averaging techniques can be used. In some implementations, the computer system can use the event-based risk score as the composite risk score and weight the event-based risk score by the role-based risk score of the user. Moreover, additional grouping of composite risk scores can be generated based on attributes associated with a user's risk profile or other information/details about the user (e.g., within a same business unit or some other type of user attribute).

As an illustrative example, the user can be an administrator in the enterprise and thus have a high role-based risk score. The user can also be associated with multiple event alerts of a high risk type during the predetermined period of time. The user's event-based risk score can be high, such as a value above 75. Since the user's role-based risk score may also be high, the event-based risk score can be weighted more heavily to determine the composite risk score. Thus, the event-based risk score can be weighted to 95, for example, based on the role-based risk score. The weighted event-based risk score of 95 can then be taken as the user's composite risk score. This approach to determining the composite risk score can be beneficial to accurately quantify a threat that the user may pose to the enterprise at a current (or present) time. After all, the composite risk score can be directly correlated to the riskiness of activities the user currently performs (or is performing within the predetermined period of time).

The computer system can then determine whether there are more users (266). In other words, the computer system can identify whether role-based, event-based, and/or composite risk scores should be determined and/or updated for any other users in the enterprise (or within a particular group and/or team in the enterprise). If there are more users, the computer system can return to 254 and repeat blocks 256-264 for each remaining user. Thus, the computer system can determine and/or update role-based, event-based, and/or composite risk scores for the remaining users. If there are no more users, the process 250 may stop.

Figure 3:
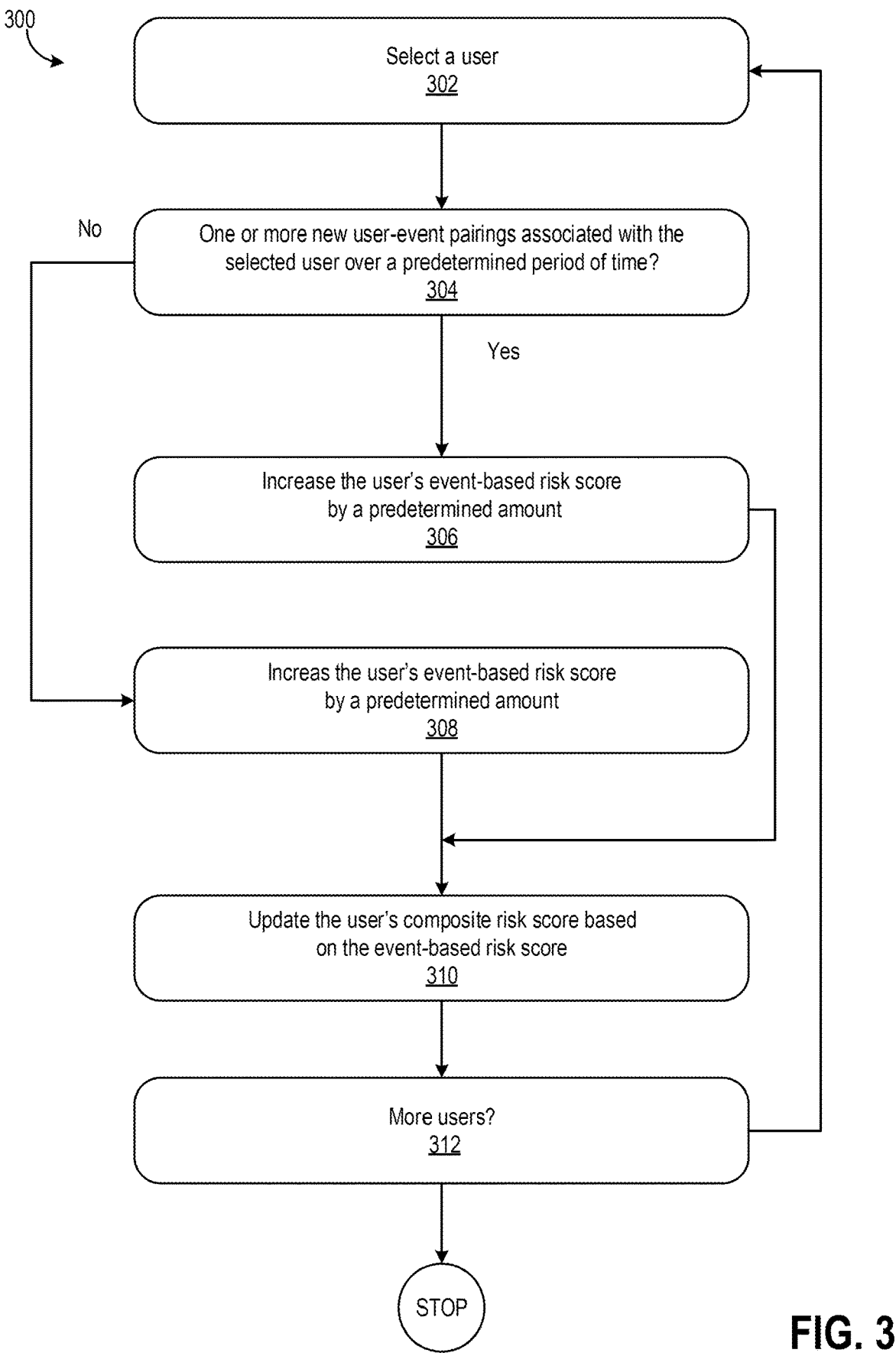
FIG. 3 is a flowchart of a process for adjusting a composite risk score of a user based on dynamic changes to user-event pairings associated with the user.

FIG. 3 is a flowchart of a process 300 for adjusting a composite risk score of a user based on dynamic changes to user-event pairings associated with the user. As described throughout this disclosure, a user's event-based risk score may dynamically change over time as the user is associated with additional or fewer event alerts. The more user-event pairings (e.g., the more event alerts associated with the user) during a predetermined period of time, the more points may be allocated to the user's event-based risk score. Consequently, the user's composite risk score may increase. The fewer user-event pairings (e.g., the less event alerts associated with the user) during the predetermined period of time, the fewer points may be allocated to the user's event-based risk score. Consequently, the user's composite risk score may decrease.

The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3, the computer system can select a user (302). As described in reference to the process 250 in FIG. 2B, the computer system can select a user from a group of users and/or a team in the enterprise. The computer system can also select any user in the enterprise. This selection can be random. The selection can also be based on one or more selection criteria. For example, the computer system can select a user that does not yet have an event-based risk score and/or a composite risk score. As another example, the computer system can select a user whose event-based risk score and/or composite risk score has not been updated within a predetermined period of time.

The computer system can determine whether one or more new user-event pairings are associated with the selected user over a predetermined period of time (304). The more user-event pairings associated with the selected user, the higher the user's event-based risk score. Thus, the user may be performing more activities in the enterprise that trigger alerts. The fewer user-event pairings associated with the selected user, the lower the user's event-based risk score. Thus, the user may be performing more activities in the enterprise that do not trigger alerts. The computer system can identify whether user-event pairings that were made during the predetermined period of time include a unique identifier that matches a unique identifier of the selected user. Thus, the computer system can determine whether the selected use is associated with any new activity that was identified, logged, and/or analyzed by the computer system or a security system during the predetermined period of time. As described in reference to the process 250 in FIG. 2B, the predetermined period of time can be a window of time that includes a present time. The predetermined period of time can also include a window of time immediately before the present time, which can be used to assess a current threat that the user may pose to the enterprise. For example, the predetermined period of time can be a past day, 2 days, 3 days, 4 days, 5 days, etc. from the present time.

In some implementations, in 304 the computer system can determine whether a quantity of new user-event pairings associated with the selected user is less than a predetermined threshold quantity. The higher the quantity of new pairings (e.g., a quantity of pairs that is greater than the predetermined threshold quantity), the higher the user's event-based risk score. The higher quantity of new pairings can indicate that, during the predetermined period of time, the selected user is continuing to engage in activities that trigger alerts and thus may pose a potential security vulnerability to the enterprise. The lower the quantity of new pairings (e.g., a quantity of pairings that is less than the predetermined threshold quantity), the lower the user's event-based risk score. The lower quantity of new pairings can indicate that, during the predetermined period of time, the selected user is changing how they act in the enterprise and performing activities that either do not trigger alerts (e.g., low risk or not risky activities) or trigger fewer alerts.

If no additional or new user-event pairings are associated with the selected user over the predetermined period of time, the computer system can proceed to block 308. Similarly, if the quantity of new user-event pairings is less than the predetermined threshold quantity, the computer system can proceed to block 308.

In 308, the computer system can decrease the user's event-based risk score by a predetermined amount. The event-based risk score can depreciate slowly over time. The predetermined amount can vary. The predetermined amount can also be a percentage of points that can be deducted from the user's event-based risk score. For example, the user's event-based risk score can be depreciated by 33% each time block 308 is performed. The predetermined amount may not exceed some threshold value. As an illustrative example, the event-based risk score may not depreciate by more than 50 points each time that the block 308 is performed by the computer system.

The predetermined amount can also be based on how much time has passed since the user was last associated with one or more event alerts. For example, the more time that passes since the last association, the greater the predetermined amount that the score can be decreased by. The predetermined amount can also be based on frequency or quantity of the new user-event pairings associated with the selected user. For example, if the user is associated with a small quantity of user-event pairings that all occurred near in time to each other during the course of the predetermined period of time, then the predetermined amount that the score is decreased can be less. If the user is associated with a small quantity of user-event pairings that occurred sporadically over the course of the predetermined period of time, then the predetermined amount that the score is decreased can be greater. In the latter, the user might have accidentally engaged in activities that triggered alerts. Thus, the computer system can be more justified to decrease the event-based risk score by a greater amount. In the former, the user might have intentionally engaged in the activities that triggered alerts in an attempt to subvert a security wall or otherwise work around security obstacles. Thus, the computer system can be more justified to decrease the event-based risk score by a smaller amount.

Once the computer system increases the user's event-based risk score to a specified threshold in 308, the computer system can proceed to block 310.

Referring back to 304, if more user-event pairings are associated with the selected user over the predetermined period of time, the computer system can proceed to block 306. Similarly, if the quantity of new user-event pairings is greater than the predetermined threshold quantity, the computer system can proceed to block 306.

In 306, the computer system can increase the user's event-based risk score by a predetermined amount. The event-based risk score can increase quickly over time. As described above, the predetermined amount can vary. The predetermined amount can also be a percentage of points that can be added to the event-based risk score. Additionally, the predetermined amount may not exceed some threshold value. The event-based risk score can be increased an amount of points based on severity of the identified risk and may also take into account whether the user is a repeat offender. The computer system can proceed to block 310 once the event-based risk score is increased.

In 310, the computer system can update the user's composite risk score based on the event-based risk score. As described in reference to the process 250 in FIG. 2B, the computer system can aggregate (e.g., average) a role-based risk score of the user with the updated event-based risk score to determine the user's composite risk score.

Next, in 312, the computer system can determine whether there are more users. For example, the computer system can determine whether there are more users to assess in a particular group or team in the enterprise. The computer system can determine whether there are more users who satisfy one or more selection criteria. If there are more users, the computer system can return to 302 and repeat 304-310 for each of the remaining users. Thus, the computer system can update event-based and/or composite risk scores for each of the remaining users. If, on the other hand, there are no more users to select, the process 300 can stop.

In some implementations, instead of block 312, the computer system can determine whether there have been any more user-event pairings since a last time that user-event pairings were determined and/or analyzed. If there are additional or new user-event pairings, then the computer system can return to either block 302 or block 304. Thus, the process 300 can be repeated or otherwise performed whenever new user-event pairings are made. If there are no more or no additional/new user-event pairings since the last time the user-event pairings were determined and/or analyzed, the process 300 can stop.

Figure 4:
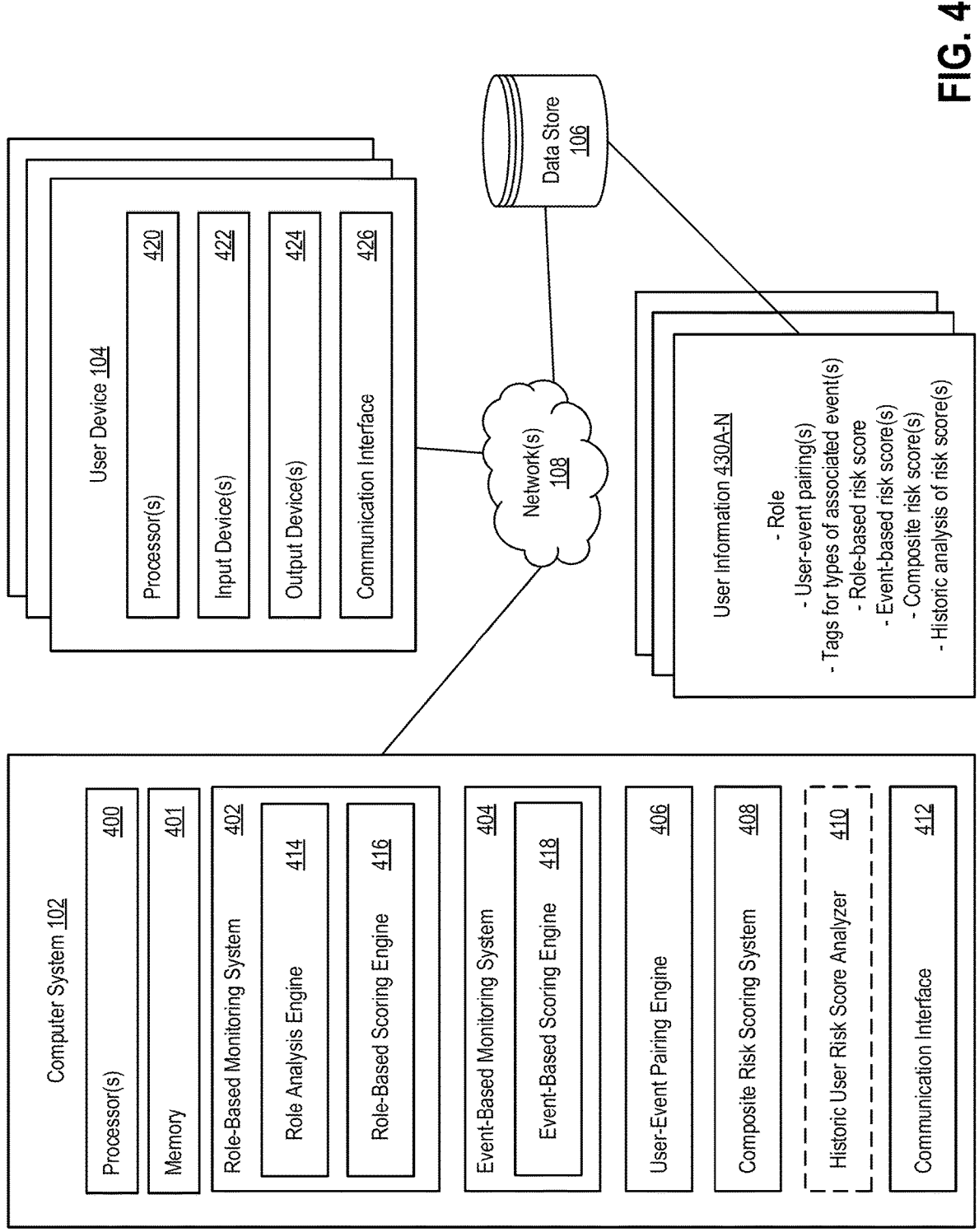
FIG. 4 is a system diagram depicting one or more components that can perform the techniques described herein.

FIG. 4 is a system diagram depicting one or more components that can perform the techniques described herein. The computer system 102, user devices 104, and data store 106 can communicate (e.g., wireless and/or wired) via the network(s) 108.

The computer system 102 can include processor(s) 400, memory 401, role-based monitoring system 402, event-based monitoring system 404, user-event pairing engine 406, composite risk scoring system 408, an optional historic user risk score analyzer 410, and a communication interface 412. The processor(s) 400 can execute instructions at the computer system 102 for performing one or more of the techniques described herein. The memory 401 can be temporary memory and/or storage at the computer system 102 (e.g., RAM, cache storage/memory). The memory 401 can be configured to temporarily store user-event pairings and/or user event-based risk scores once those scores are determined. The event-based risk scores can be cached in memory 401 until they are retrieved and used to determine the respective user's composite risk scores. As described throughout this disclosure, the event-based risk scores may not be stored in the data store 106, since they may be dynamically updated in real-time or near real-time, whenever new user-event pairings are identified for a particular user. Thus, caching the user-event pairings and/or the event-based risk scores can save compute resources and provide for more efficient processing with available resources. In some implementations, however, one or more event-based risk scores may be stored in the data store 106 in addition to or instead of caching in the memory 401.

The role-based monitoring system 402 can be configured to determine role-based risk scores for users in the enterprise. Refer to blocks 256-258 in the process 250 of FIG. 2B for further discussion about determining the role-based risk scores for the users in the enterprise. The role-based monitoring system 402 can include a role analysis engine 414 and a role-based scoring engine 416.

The role analysis engine 414 can be configured to identify a role of a user and risks associated with that role. The role analysis engine 414 can access user information 430A-N from the data store 106. The user information 430A-N can include a role of the user. As described in the process 250 in FIG. 2B, the role analysis engine 414 can use a lookup table to identify risks associated with the particular role of the user. Once the role analysis engine 414 identifies the user's role and associated risks, the engine 414 can transmit this information to the role-based scoring engine 416.

The role-based scoring engine 416 can be configured to generate a role-based risk score for the particular user based on the information received from the role analysis engine 414. As described in reference to the process 250 in FIG. 2B, the role-based scoring engine 416 can assign a predetermined or threshold quantity of points to the user's role-based risk score based on the risks associated with the user's role and/or interactions with external systems that also identify risk. The engine 416 and use a lookup table that correlates risks of different roles with quantities of points to allocate to a role-based risk score. The lookup table can be the same as or different than the lookup table used by the role analysis engine 414. A role with higher or more risks can be correlated with a higher quantity of points than a role with lower or fewer risks.

The lookup tables described in reference to the role analysis engine 414 and the role-based scoring engine 416 can be stored in the data store 106 and retrieved by the role-based monitoring system 402. The role-based risk scores that are determined by the role-based monitoring system 402 can also be stored in the data store 106 in the user information 430A-N.

The event-based monitoring system 404 can be configured to determine and generate users' event-based risk scores. Refer to blocks 260-262 in the process 250 of FIG. 2B and the process 300 of FIG. 3 for additional discussion on determining event-based risk scores. The event-based monitoring system 404 can include an event-based scoring engine 418. The engine 418 can be configured to determine how many points to allocate to a user's event-based risk score based on what activities are associated with the user (e.g., user-event pairings). The engine 418 can increase an existing event-based risk score for a user. The engine 418 can also depreciate an existing event-based risk score for the user. The engine 418 can retrieve user-event pairings from the user information 430A-N in the data store 106. The engine 418 can also retrieve user-event pairings that are temporarily stored/cached by the user-event pairing engine 406 in the memory 401. Sometimes, the engine 418 can also receive the user-event pairings directly from the user-event pairing engine 406.

The engine 418 can assess the user-event pairings to determine whether to increase or decrease the user's event-based risk score and/or how many points to allocate to the event-based risk score. A higher quantity of user-event pairings and/or increased frequency of user-event pairings during a predetermined period of time can result in more points being allocated to the user's event-based risk score. Conversely, a smaller quantity of user-event pairings and/or decreased frequency of user-event pairings during the predetermined period of time can result in fewer points being allocated to the user's event-based risk score. As another example, user-event pairings that are identified or tagged as higher risk can result in more points being allocated to the user's event-based risk score in comparison to user-event pairings that are identified or tagged as lower risk.

Event-based risk scores that are determined by the engine 418 can be temporarily stored/cached in the memory 401, then retrieved by the composite risk scoring system 408 to determine composite risk scores for the users. In some implementations, the engine 418 may store the event-based risk scores in the corresponding user information 430A-N in the data store 106.

The user-event pairing engine 406 can be configured to associate event alerts with users in the enterprise. Refer to the process 200 in FIG. 2A for further discussion on pairing event alerts with users. In brief, the engine 406 can pair event alerts with users using one or more objective identifiers. The objective identifiers can include email addresses and/or IP addresses. An event alert can include metadata, such as objective identifiers associated with the event. Thus, the engine 406 can identify the objective identifiers in the event alert and determine whether those identifiers match any of the objective identifiers that are known for users in the enterprise. If there is a match, the engine 406 can pair the event alert with the matching user.

The engine 406 can temporarily store/cache the user-event pairings in the memory 401. The engine 406 can, in some implementations, also store the user-event pairings in the user information 430A-N in the data store 106.

The engine 406 can also be configured to identify a type of event and/or a type of risk associated with the event alerts that are paired with users. In some implementations, the event-based monitoring system 404 can identify the type of event and/or the type of risk associated with the event alerts. The engine 406 can generate a tag that identifies the type of the event and/or the type of risk. The tag can be stored in the user information 430A-N in the data store 106. The tag can then be used for future analysis of the user's past (e.g., historic) activities and scores.

The composite risk scoring system 408 can be configured to determine a composite risk score for a user. Refer to block 210 in the process 200 of FIG. 2A, block 264 in the process 250 of FIG. 2B, and block 310 in the process 300 of FIG. 3 for additional discussion about determining the composite risk score of the user. In brief, the composite risk scoring system 408 can retrieve the role-based risk score and/or the event-based risk score for the user from the user information 430A-N in the data store 106. The system 408 can also receive the role-based risk score and/or the event-based risk score directly from the role-based monitoring system 402 and the event-based monitoring system 404, respectively. The system 408 may also, as described herein, retrieve the event-based risk score from the memory 401.

The composite risk scoring system 408 can then aggregate (e.g., average, standard deviation, other statistical processes) the role-based and event-based risk scores to generate the composite risk score for a particular user. The system 408 may also update an existing composite risk score when the user's event-based risk score changes (e.g., new user-event pairings are associated with the user during the predetermined period of time). In some implementations, as described herein, the system 408 may also determine the composite risk score to be the event-based risk score. The system 408 can apply a weight to the event-based risk score that is based on or derived from the role-based risk score for the user. The determined composite risk score can be stored in the user information 430A-N in the data store 106.

The historic user risk score analyzer 410 can be optionally included in the computer system 102. The analyzer 410 can be configured to assess past composite risk scores and/or event-based risk scores of a user to determine how the user has changed their behavior over time, why they had particular scores in the past, whether they may be a repeat offender, and/or whether they may pose a present or future threat to the enterprise. Thus, the analyzer 410 can be beneficial to develop a more holistic understanding of how and why users act the way they do in the enterprise to better assess internal threats to the enterprise.

The historic user risk score analyzer 410 can retrieve any of the user information 430A-N (e.g., role, user-event pairing(s), tags for types of associated event(s), role-based risk score, event-based risk score(s), and composite risk score(s)) from the data store 106. The analyzer 410 can process this information, for example using one or more machine learning trained models, to generate historic trends of the user's behavior/activities. The analyzer 410 can also process this information to predict or project the user's future (i) behavior/activities, (ii) event-based risk scores, and/or (iii) composite risk scores. Thus, the analyzer 410 can predict whether the user may pose a current threat or a future threat to the enterprise based on a historic lookback. For example, the analyzer 410 can analyze the tags for types of events that have been associated with the user to project what types of events the user is more likely to perform/engage in. The analysis of tags can therefore be an indicator of whether the user likely and/or frequently engages in types of activity that may pose a security threat to the enterprise. Historic analysis that is performed by the analyzer 410 can be stored in the user information 430A-N in the data store 106.

The user device 104 can be used by a relevant user, such as a security analyst, in the enterprise. The user device 104 can present information to the user about other users in the enterprise. For example, the user device 104 can present composite risk scores of users in the enterprise. The user device 104 can also present other information about the users that can be used by the security analyst to monitor the users and response to potentially threatening activity in the enterprise.

The user device 104 can be any type of computing device, including but not limited to a computer, laptop, tablet, cellphone, mobile phone, and/or smartphone. The user device 104 can include a processor(s) 420, input device(s) 422, output device(s) 424, and communication interface 426. The processor(s) 420 can execute instructions that cause the user device 104 to perform one or more of the techniques described herein. The input device(s) 422 can include any type of device that can be used to provide input, by the user, to the user device 104. The input device(s) 422 can include but are not limited to keyboards, microphones, mice, and/or touchscreen displays.

The user can provide input via the input device(s) 422 such as selection of role-based, event-based, and/or composite risk scores for one or more users, teams of users, and/or groups of users. The user can also provide input such as selection of one or more operations/actions that can be performed in response to composite risk scores that are outputted by the user device 104. For example, the user can review the composite risk scores that are outputted by the user device 104 and determine that one or more users associated with the composite risk scores should be monitored more closely. Thus, the user can provide input to the user device 104 that indicates the user's desire to monitor those one or more users more closely. Those one or more users can, for example, be added to a watch list. In some implementations, case files can be generated for the one or more users. One or more other operations can be performed in response to the user determining (and providing input to that effect) that one or more users should be monitored more closely.

The output devices(s) 424 can include any type of device that may provide output or otherwise display information to the user at the user device 104. The output device(s) 424 can include but is not limited to touchscreens, other types of display screens, speakers, headphones, and/or other types of devices for presenting information. The output device(s) 424 can display information, in a graphical user interface (GUI) display, such as a list of composite risk scores and their associated users in the enterprise. The composite risk scores can be ranked in the list from highest to lowest score. The output device(s) 424 can also display composite risk scores for one or more groups and/or teams of users in the enterprise (e.g., a group and/or team that is identified by the user as input to the user device 104). The output device(s) 424 can also display selectable options for actions that can be taken in response to event-based and/or composite risk scores of users, as described above. One or more other information can also be presented to the user at the user device 104 via the output device(s) 424.

The user devices 104 can also be used by users in the enterprise other than security analysts. For example, employees of the enterprise can utilize the user devices 104 to perform their job role functions and responsibilities. Sometimes, the users can also utilize the user devices 104 to engage in activities that are personal or otherwise do not align with the users' job role functions and responsibilities. The user devices 104 can be enterprise-owned devices. The user devices 104 may also be user-owned devices that connect with a network of devices in the enterprise.

Finally, the communication interfaces 412 and 426 can be configured to provide communication between the components described herein.

FIG. 5A is a conceptual diagram for determining composite risk scores for users in an enterprise. As described herein, users 526 of the enterprise can engage in activities on the user devices 104. Such activities can be benign or malicious. The activities can be part of the functions and/or responsibilities of a user 526's job role. Sometimes, the activities may not be part of the user 526's job role. Regardless, associations can be made between activities performed at the user devices 104 and the users 526 in the enterprise. Some associations may be known between the users 526 and the user devices 104. In some implementations, some associations may not be known between the users 526 and the user devices 104.

The role-based monitoring system 402, as described throughout this disclosure, can receive information about the users 526, such as their roles, responsibilities, privileges, entitlements, etc. Using this information, the role-based monitoring system 402 can identify risks associated with each role of each user 526. Using the identified risks, the role-based monitoring system 402 can determine role-based risk scores for the users 526.

The event-based monitoring system 404, as described throughout this disclosure, can receive information about activities or events (e.g., associations with users, user-event pairings, objective identifiers, frequency, timestamp, tag identifying the type of activity or event, etc.) that occur at the user devices 104. The event-based monitoring system 404 is described further in FIGS. 5B-C. Using the received information, the event-based monitoring system 404 can determine dynamic event-based risk scores for the users 526.

The composite risk scoring system 408 can receive the role-based risk scores from the role-based monitoring system 402 and the event-based risk scores from the event-based monitoring system 404. Using the role-based and event-based risk scores, the composite risk scoring system 408 can determine composite risk scores 550A-N, as described throughout this disclosure. Each of the users 526 can receive a respective composite risk score 550A-N.

FIGS. 5B-C are block diagrams of an example system for generating events in response to network activity. The example system depicted in FIGS. 5B-C is the event-based monitoring system 404. In some implementations, the techniques described in reference to FIGS. 5B-C can be performed by another computing system, such as a security system.

Referring to FIG. 5B, a network 502 is being protected by one or more security analysts. The security analysts are users that are tasked with monitoring the security state of the network 502 and to prevent malicious activity like malware execution, data exfiltration, etc.

The network 502 is, for example, a local network, intranet, virtual private network, or other data network used by an organization. The network 502 can include networking hardware such as cables, wireless access points, routers, gateways, firewalls, etc., that work together to allow resident machines 504 to communicate with other resident machines 504 and with computing resources outside of the network 502. The resident machines 504 can include, but are not limited to, personal computers, servers, and mobile devices.

Operations of the network 502 and resident machines 504 may come under attack from malicious actors—users and/or automated services that seek to exploit computing resources they do not own or have authorization to use. The event-based monitoring system 404 can be configured to provide monitoring functionality that generates data based on the activity on the network—including malicious activity. This monitoring can then be provided to a security analyst that is tasked with stopping or attempting to stop these attacks through various types of security responses.

When the resident machines 504 participate in data transmission on the network 502, an array of network security sensors 506 can sense the network activity and generate data for one or more events that represent the activity. For example, the sensors 506 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 506. Depending on the size and scale of the network 502, one array of network sensors 506 may have more or fewer sensors than another array of network sensors. In various examples, hundreds, thousands, tens of thousands, or hundreds of thousands of sensors can be used, although more or fewer are possible. In addition or in the alternative, the sensors 506 can also record non-network activity. For example, when devices hosted on the network perform sensitive operations (e.g., accessing a sensitive data repository, executing applications, etc.), the sensors 506 can sense these activities.

The sensors can provide the initial event data 508 to one or more initial event queues 510. The initial event data 508 may include data objects that do not conform to any single format or structure, may be out of chronological order, and may otherwise be non-homogeneous. The initial event queues 510 can receive the initial event data 508 and deserialize the data objects of the initial event data 508 into deserialized event data 512. The deserialized event data 512 can include all or part of the data included in the initial event data 508, and has been deserialized. In general, serialization of data involves the transforming or reconfiguring of data so that it can be stored, transmitted, etc. For example, the serialization process performed by the initial event queues 510 can include padding out short data strings or removing redundant data, decompressing compressed data, changing the format, etc.

One or more normalizer/decorator pipelines 514 can receive the deserialized event data 512 from the initial event queues 510 and process the deserialized event data 512 into normalized/decorated event data 516. For example, the normalizer/decorator pipelines 514 can normalize the deserialized event data 512 by editing its structure so that the structure complies with one or more standards, and the normalizer/decorator pipelines 514 can decorate the deserialized event data 512 by adding data to the events from other sources (e.g., timestamps, geo-location data, threat intelligence data, a connection-identifier.)

The number of normalizer/decorator pipelines 514 can change depending on the load of the initial event queues 510. For example, new instances of normalizer/decorator pipelines 514 can be generated and used when a backlog of deserialized event data 512 is prepared by the initial event queue 510, and these normalizer/decorator pipelines 514 can be released and idle when the backlog falls under a threshold size, is empty, begins trending downward, etc.

In some cases, the ramp-up of the normalizer/decorator pipelines 514 can be more sensitive than the ramp-down. That is, a particular growth in backlog may cause more normalizer/decorator pipelines 514 to be instantiated faster than a similar reduction in backlog. This may be accomplished, for example, by adding N normalizer/decorator pipelines 514 every time-unit (e.g., second, 30 seconds, minute, hour) a backlog over a certain size is seen, and removing only M normalizer/decorator pipelines 514 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The event-based monitoring system 404 can be configured to use the normalizer/decorator pipelines 514 to efficiently make matches and append flags to data. One such type of flag is an Indicator of Compromise (IoC) that indicates the presence of a high risk security event. IoC can generally include single pieces of information that can be quickly examined and flagged. By using simple, single data matching, fewer computational resources may be required compared to more complex matching. By appending the IoC with the normalizer/decorator pipelines 514, later elements such as a security frontend 524 may be executed with less resources than would otherwise be needed. For example, the normalizer/decorator pipelines 514 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator data store 522 can collect structured event data 520 and store the structured event data 520 in an indexable and searchable data store 522. The aggregator data store 522 may store all of the structured event data 520 until the aggregator data store 522 is full or otherwise storing at least a threshold amount of data or data older than a threshold period of time. When this volume or age of data is reached, the oldest data may be discarded, making room for new data. That is, the aggregator data store 522 may operate as a rolling buffer that provides storage for the new data, discarding the old data. Other storage systems (not shown here for clarity) can be used for long-term or archival storage, which may provide less expensive storage that is slower to respond to queries.

The security frontend 524 can provide a graphical user interface (GUI) to a computer and/or other devices used by a security analyst 526. The GUI can provide the security analyst 526 with access to the structured event data 520 that is stored in the aggregator data store 522 in a way that allows the security analyst 526 to understand and more quickly investigate security events of the network 502 that may or may not be malicious. For example, the GUI can provide the security analyst 526 with tools to draft queries, test the queries on the structured event data 520, and then store the same query for use as a rule on future events that are collected from the network 502.

In addition, the security frontend 524 can execute one or more rules on the incoming structured event data 520. These rules may contain conditional statements that, if ever found true on incoming event data, trigger response statements. These response statements can include instructions for automated responses (e.g., quarantining a device on the network 502, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the event-based system 404 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipelines 514 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with the event-based monitoring system 404. In one example, an enterprise data network that connects hundreds of physical locations and millions of devices can be effectively and efficiently monitored. In this example, tens of thousands sensors 506 can produce tens of trillions of events a day (including hundreds of thousands or millions of events a second). The event-based monitoring system 404 can be created using hardware resources that may be well within an enterprise of this size and scope, and provide access to events in the aggregator datastore 522 within seconds of the event occurring on the network. Further, the rules may be run on the events every minute or every handful of minutes.

Further, the use of a rolling buffer in the aggregator datastore 522 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

FIG. 5C is a block diagram of optional elements of the event-based monitoring system 404. As shown here, the normalized event queue 518 can include one or more normalized queues from which network event data can be provided to IoC engines 530 for processing against IoC rules. The IoC engines 530 can receive network event data, either structured or unstructured, along with other pertinent data to the event data, such as additional information added to the network event data in the normalizer/decorator pipelines 514. The IoC engines 530 can access one or more IoC rules from the IoC rules datastore 532 and compare the normalized event data 516 against these rules. If a normalized event data 516 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 522 for processing against the more computationally intensive rules.

The rules in the IoC rules datastore 532 can include one or more rules that are easy to process (e.g., require few computational resources to run) relative to the rules run against the aggregator datastore 522. Bifurcating processing of the more computationally simple IoC rules from the more complex rules run against the aggregator datastore 522 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 532 can include a dynamic rules engine to perform comparison based on the rules stored in the IoC rules datastore 532. When the rules change, the IoC rules datastore 532 can detect the change and initiate an engine rebuild to create a second rules engine using the updated rules. While the rebuild is being performed, traffic can continue to be routed to the first, older, rules engine. Then, when the rebuild is completed, the IoC rules datastore 532 can route new traffic to the second rules engine. Once all the traffic routed to the first rules engine is acted upon, the IoC rules datastore 532 can decommission the old rules engine.

The IoC engine deposits the structured event data 520 into an IoC alert queue 534. The IoC alert queue 534 can collect the received structured event data 520 for storage in the aggregator datastore 522. As described in reference to FIG. 5B, the structured event data 520 can then be outputted in GUIs at user devices of the security analysts.

Figure 6:
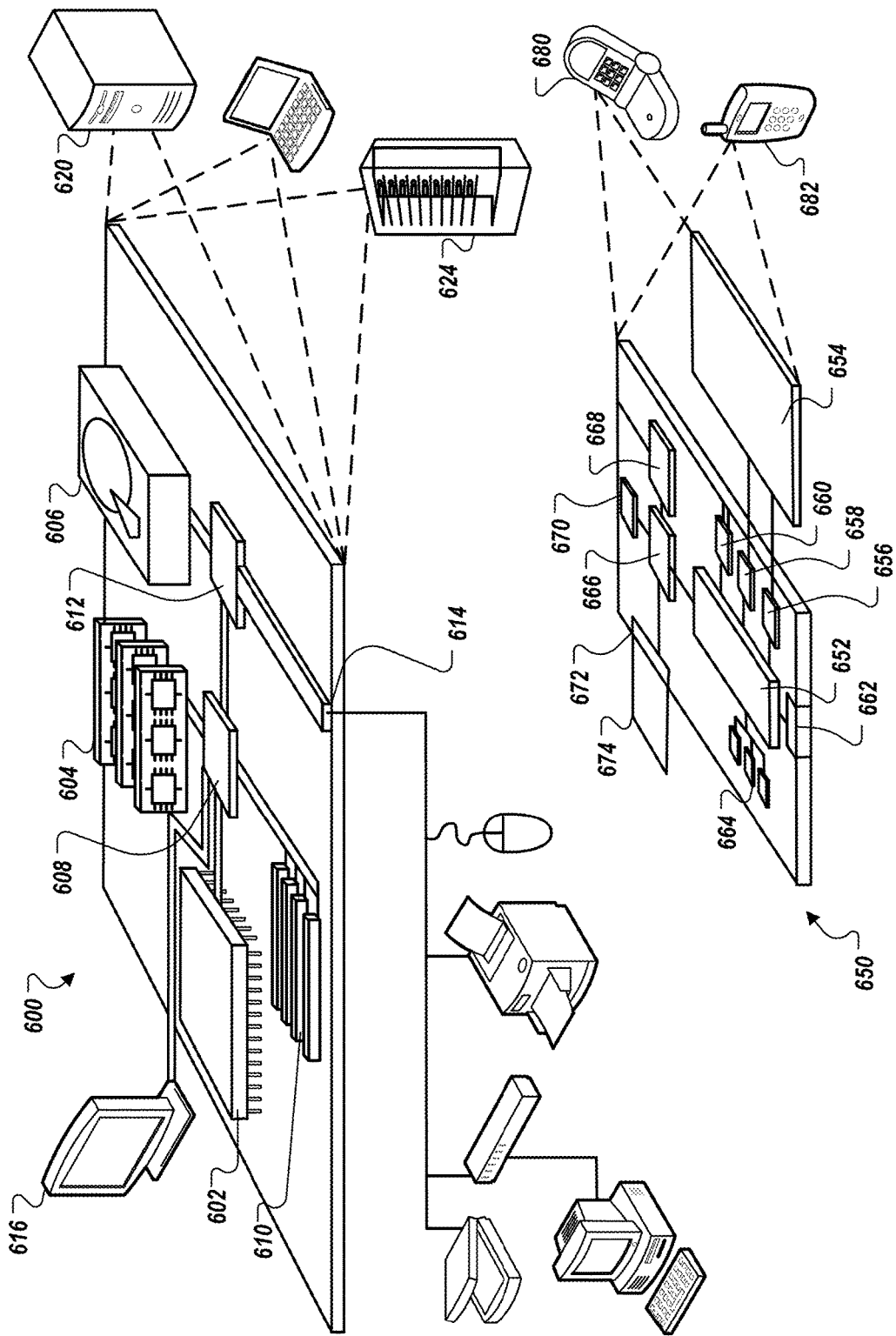
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for monitoring internal security vulnerabilities in an enterprise based on determining composite risk scores for users in the enterprise, the method comprising:
receiving, by a computing system, information about a user in the enterprise, wherein the information includes a role of the user;
identifying, by the computing system and based on the information about the user, risks associated with the role of the user;
determining, by the computing system and based on the risks associated with the role of the user, a role-based risk score for the user, wherein the role-based risk score is a static value for the role of the user and other users in the same role;
receiving, by the computing system, a plurality of event alerts from a network security detection system, each of the plurality of event alerts having been generated by the network security detection system identifying network activity on a network for the enterprise that satisfies one or more security event rules indicative of a potential network security issue;

determining, by the computing system and based on information associated with the plurality of event alerts, that one or more event alerts from among the plurality of event alerts are associated with the user in the enterprise to generate user-event pairings;

assigning, by the computing system, a tag for each event alert in the user-event pairings that correspond to the user, wherein the tag is associated with a numerical value that indicates a severity of risk for the corresponding event alert;

determining, by the computing system and based on the user-event pairings, an event-based risk score for the user, wherein the event-based risk score is a dynamic value, wherein determining the event-based risk score for the user is based on the tag assigned to each event alert in the user-event pairings such that a quantity of points allocated to the event-based risk score for the user is based on the assigned tag, wherein determining the event-based risk score for the user further comprises:

obtaining historic information about previous events that have been attributed to the user during a previous time period, wherein the previous events were assigned tags, identifying severity of risk of each of the previous events based on the assigned tags, determining a current risk that the user poses to the enterprise based on a combination of (i) an amount of time that passed since the previous time period and (ii) the identified severity of risk of the previous events, determining a depreciation rate for the user based on (i) the role of the user and (ii) a quantity of event alerts that are associated with the user over a threshold time period, wherein determining the depreciation rate comprises determining a lower depreciation rate based on less than a threshold quantity of the event alerts occurring over the threshold time period and determining a higher depreciation rate based on greater than the threshold quantity of event alerts occurring over the threshold time period, and dynamically adjusting the event-based risk score based on (i) the current risk that the user poses to the enterprise and (ii) the determined depreciation rate for the user;

generating, by the computing system, a composite risk score for the user based on applying the role-based risk score for the user as a weight to the event-based risk score for the user, wherein the composite risk score for the user is independent of and determined separately from composite risk scores for other users in the enterprise;

ranking, by the computing system, the composite risk score for the user in a list of the composite risk scores for the users in the enterprise; and transmitting, by the computing system and to a user device, information indicating a position of the user in the ranked list of composite risk scores for the users in the enterprise to be outputted in a graphical user interface (GUI) display at the user device, wherein the position of the user in the ranked list of composite risk scores for the users in the enterprise indicates a degree of risk that the user poses to the enterprise relative to the other users in the enterprise.

2. The method of claim 1, further comprising caching, by the computing system, the event-based risk score in local memory.

3. The method of claim 1, further comprising caching, by the computing system, the user-event pairings in local memory.

4. The method of claim 1, wherein determining, by the computing system, the role-based risk score for the user comprises:

accessing a lookup table of point allocations per role in the enterprise;

identifying a quantity of points to allocate to the role-based risk score that corresponds to the risks associated with the role of the user in the lookup table; and adding the quantity of points to the role-based risk score of the user.

5. The method of claim 1, wherein determining, by the computing system, the event-based risk score for the user is further based on at least one of (i) a type of the user-event pairings that correspond to the user and (ii) a frequency of occurrence of the user-event pairings that correspond to the user during a predetermined period of time.

6. The method of claim 1, wherein determining, by the computing system, the event-based risk score for the user comprises increasing the event-based risk score for the user by a predetermined amount of points based on at least one of (i) a quantity of the user-event pairings during a predetermined period of time that exceeds a threshold quantity of events and (ii) a frequency of occurrence of the user-event pairings that correspond to the user during the predetermined period of time exceeding a threshold frequency.

7. The method of claim 1, wherein determining, by the computing system, the event-based risk score for the user comprises depreciating the event-based risk score for the user by a predetermined amount of points based on at least one of (i) a quantity of the user-event pairings during a predetermined period of time being less than a threshold quantity and (ii) a frequency of occurrence of the user-event pairings that corresponds to the user during the predetermined period of time being less than a threshold frequency.

8. The method of claim 1, further comprising:

receiving, by the computing system, a second plurality of event alerts;

determining, by the computing system and based on information associated with the second plurality of event alerts, that one or more event alerts from among the second plurality of event alerts are associated with the user in the enterprise to generate second user-event pairings;

updating, by the computing system and based on one or more of the second user-event pairings that correspond to the user, the event-based risk score for the user; and updating, by the computing system, the composite risk score for the user based on a combination of the role-based risk score and the updated event-based risk score for the user.

9. The method of claim 1, wherein the information associated with the plurality of event alerts each includes an objective identifier that matches information of at least one user in the enterprise, wherein the objective identifier includes at least one of an IP address and an email address.

10. The method of claim 1, wherein:

the method further comprises:

storing, by the computing system, the assigned tags in a data store;

accessing, by the computing system, the assigned tags from the data store;

identifying, by the computing system and based on the assigned tags, the severity of risk of each of the previous events, wherein the assigned tags correspond to historic behavior of the user, wherein the historic behavior indicates types of activity that the user had previously engaged in; and determining, by the computing system and based on the historic behavior of the user, whether the user is a repeat offender.

11. The method of claim 1, further comprising:

sensing, by a plurality of network sensors of the computing system, operations of a data network in the enterprise;

generating, by the plurality of network sensors of the computing system and based on sensing the operations of the data network, event data objects that record the operations of the data network; and decorating, by one or more decorator pipelines of the computing system, the event data objects with data other than from the operations of the data network to generate the one or more event alerts.

12. A system for monitoring internal security vulnerabilities in an enterprise based on determining composite risk scores for users in the enterprise, the system comprising:

at least one processor; and a memory device storing instructions that are operable, when executed by the at least one processor one or more computers, to cause the at least one processor to perform operations comprising:

receiving information about a user in the enterprise, wherein the information includes a role of the user;

identifying, based on the information about the user, risks associated with the role of the user;

determining, based on the risks associated with the role of the user, a role-based risk score for the user, wherein the role-based risk score is a static value for the role of the user and other users in the same role;

receiving a plurality of event alerts from a network security detection system, each of the plurality of event alerts having been generated by the network security detection system identifying network activity on a network for the enterprise that satisfies one or more security event rules indicative of a potential network security issue;

determining, based on information associated with the plurality of event alerts, that one or more event alerts from among the plurality of event alerts are associated with the user in the enterprise to generate user-event pairings;

assigning a tag for each event alert in the user-event pairings that correspond to the user, wherein the tag is associated with a numerical value that indicates a severity of risk for the corresponding event alert;

determining, based on the user-event pairings, an event-based risk score for the user, wherein the event-based risk score is a dynamic value, wherein determining the event-based risk score for the user is based on the tag assigned to each event alert in the user-event pairings such that a quantity of points allocated to the event-based risk score for the user is based on the assigned tag, wherein determining the event-based risk score for the user further comprises:

obtaining historic information about previous events that have been attributed to the user during a previous time period, wherein the previous events were assigned tags, identifying severity of risk of each of the previous events based on the assigned tags, determining a current risk that the user poses to the enterprise based on a combination of (i) an amount of time that passed since the previous time period and (ii) the identified severity of risk of the previous events, determining a depreciation rate for the user based on (i) the role of the user and (ii) a quantity of event alerts that are associated with the user over a threshold time period, wherein determining the depreciation rate comprises determining a lower depreciation rate based on less than a threshold quantity of the event alerts occurring over the threshold time period and determining a higher depreciation rate based on greater than the threshold quantity of event alerts occurring over the threshold time period, and dynamically adjusting the event-based risk score based on (i) the current risk that the user poses to the enterprise and (ii) the determined depreciation rate for the user;

generating a composite risk score for the user based applying the role-based risk score of the user as a weight to the event-based risk score for the user;

transmitting, to a user device, the composite risk score for the user to be outputted in a graphical user interface (GUI) display at the user device;

determining, based on applying a machine learning model to the composite risk score for the user, a future risk that the user poses to the enterprise, wherein the machine learning model was trained to generate trends of user behavior and user activities based on at least composite risk scores for users; and returning the determined future risk that the user poses to the enterprise.

13. The system of claim 12, the operations further comprising: storing the role-based risk score in a data store.

14. The system of claim 12, the operations further comprising caching the event-based risk score in local memory.

15. The system of claim 12, the operations further comprising caching the user-event pairings in local memory.

16. The system of claim 12, wherein determining the role-based risk score for the user comprises:

accessing a lookup table of point allocations per role in the enterprise;

identifying a quantity of points to allocate to the role-based risk score that corresponds to the risks associated with the role of the user in the lookup table; and adding the quantity of points to the role-based risk score of the user.

17. A method for monitoring internal security vulnerabilities in an enterprise based on determining composite risk scores for users in the enterprise, the method comprising:

receiving information about a user in the enterprise, wherein the information includes a role of the user;

identifying, based on the information about the user, risks associated with the role of the user;

determining, based on the risks associated with the role of the user, a role-based risk score for the user, wherein the role-based risk score is a static value for the role of the user and other users in the same role;

receiving a plurality of event alerts from a network security detection system, each of the plurality of event alerts having been generated by the network security detection system identifying network activity on a network for the enterprise that satisfies one or more security event rules indicative of a potential network security issue;

determining, based on information associated with the plurality of event alerts, that one or more event alerts from among the plurality of event alerts are associated with the user in the enterprise to generate user-event pairings;

assigning a tag for each event alert in the user-event pairings that correspond to the user, wherein the tag is associated with a numerical value that indicates a severity of risk for the corresponding event alert;

determining, based on the user-event pairings, an event-based risk score for the user, wherein the event-based risk score is a dynamic value, wherein determining the event-based risk score for the user is based on the tag assigned to each event alert in the user-event pairings such that a quantity of points allocated to the event-based risk score for the user is based on the assigned tag, wherein determining the event-based risk score for the user further comprises:

obtaining historic information about previous events that have been attributed to the user during a previous time period, wherein the previous events were assigned tags, identifying severity of risk of each of the previous events based on the assigned tags, determining a current risk that the user poses to the enterprise based on a combination of (i) an amount of time that passed since the previous time period and (ii) the identified severity of risk of the previous events, determining a depreciation rate for the user based on (i) the role of the user and (ii) a quantity of event alerts that are associated with the user over a threshold time period, wherein determining the depreciation rate comprises determining a lower depreciation rate based on less than a threshold quantity of the event alerts occurring over the threshold time period and determining a higher depreciation rate based on greater than the threshold quantity of event alerts occurring over the threshold time period, and dynamically adjusting the event-based risk score based on (i) the current risk that the user poses to the enterprise and (ii) the determined depreciation rate for the user;

generating a composite risk score for the user based on applying the role-based risk score of the user as a weight to the event-based risk score for the user, wherein the composite risk score for the user is independent of and determined separately from composite risk scores for other users in the enterprise;

ranking the composite risk score for the user in a list of the composite risk scores for the users in the enterprise;

transmitting, to a user device, information indicating a position of the user in the ranked list of composite risk scores for the users in the enterprise to be outputted in a graphical user interface (GUI) display at the user device, wherein the position of the user in the ranked list of composite risk scores for the users in the enterprise indicates a degree of risk that the user poses to the enterprise relative to the other users in the enterprise;

determining, based on applying a machine learning model to the composite risk score for the user, a future risk that the user poses to the enterprise, wherein the machine learning model was trained to generate trends of user behavior and user activities based on at least composite risk scores for users; and returning the determined future risk that the user poses to the enterprise.

18. The method of claim 17, wherein determining the role-based risk score for the user comprises:

accessing a lookup table of point allocations per role in the enterprise;

identifying a quantity of points to allocate to the role-based risk score that corresponds to the risks associated with the role of the user in the lookup table; and adding the quantity of points to the role-based risk score of the user.

19. The method of claim 17, wherein determining the event-based risk score for the user is further based on at least one of (i) a type of the user-event pairings that correspond to the user and (ii) a frequency of occurrence of the user-event pairings that correspond to the user during a predetermined period of time.

20. The method of claim 17, wherein determining the event-based risk score for the user comprises increasing the event-based risk score for the user by a predetermined amount of points based on at least one of (i) a quantity of the user-event pairings that correspond to the user during a predetermined period of time exceeding a threshold quantity and (ii) a frequency of occurrence of the user-event pairings that correspond to the user during the predetermined period of time exceeding a threshold frequency.

\* \* \* \* \*